(12) United States Patent
Paterson

(10) Patent No.: US 12,464,962 B2
(45) Date of Patent: Nov. 11, 2025

(54) AGRICULTURAL TILLING SYSTEM AND COMPONENTS

(71) Applicant: KS Paterson Nominees Pty Ltd., Bute (AU)

(72) Inventor: Kentyn Paterson, Bute (AU)

(73) Assignee: KS PATERSON NOMINEES PTY LTD., Bute (AU)

(*) Notice: Subject to any disclaimer, the term of this patent is extended or adjusted under 35 U.S.C. 154(b) by 683 days.

(21) Appl. No.: 17/650,904

(22) Filed: Feb. 14, 2022

(65) Prior Publication Data

US 2022/0159891 A1    May 26, 2022

Related U.S. Application Data

(63) Continuation of application No. 16/641,150, filed as application No. PCT/AU2018/050910 on Aug. 24, 2018, now Pat. No. 11,266,052.

(30) Foreign Application Priority Data

Aug. 24, 2017 (AU) .............................. 2017903411
Sep. 12, 2017 (AU) .............................. 2017903706
(Continued)

(51) Int. Cl.
*A01B 21/08* (2006.01)
*A01B 7/00* (2006.01)
*A01B 23/06* (2006.01)

(52) U.S. Cl.
CPC .............. *A01B 21/08* (2013.01); *A01B 7/00* (2013.01); *A01B 23/06* (2013.01)

(58) Field of Classification Search
CPC .................................. A01B 7/00; A01B 23/06
See application file for complete search history.

(56) References Cited

U.S. PATENT DOCUMENTS 1,568,897 A * 1/1926 McKay ................. A01B 21/08
                                                      172/536
2,449,062 A    9/1948 Dewey
(Continued)

FOREIGN PATENT DOCUMENTS

CN    203771026 U    8/2014
EP       2397024 A1   12/2011
(Continued)

OTHER PUBLICATIONS

Communication received in European Application No. 18847798.8, dated Mar. 1, 2023.
(Continued)

*Primary Examiner* — Tara Mayo
(74) *Attorney, Agent, or Firm* — Greer, Burns & Crain, Ltd

(57) ABSTRACT

An agricultural tilling assembly has an elongate structure, and at least one ground engaging tool sub-assembly. The sub-assembly includes a hub having a mounting portion, a ground engaging tool securable to the hub or integrally formed therewith, and a weight having a body with an open aperture having a mouth, the mouth configured for enabling the weight plate to be threaded over the elongate structure so that the elongate structure extends through the aperture, and the open aperture configured so that the weight plate is maneuverable over a portion of a length of the hub whilst in situ on the elongate structure and to be beatable on the mounting portion. The ground engaging tool is connectable to a respective one of the hubs of the tilling assembly whilst that hub is retained interconnected in situ on the tilling assembly, and without removing another ground engaging tool from the tilling assembly.

15 Claims, 21 Drawing Sheets

(30) Foreign Application Priority Data

| Sep. 12, 2017 | (AU) | ................................ 2017903707 |
| Sep. 12, 2017 | (AU) | ................................ 2017903708 |
| Sep. 12, 2017 | (AU) | ................................ 2017903709 |

(56) References Cited

U.S. PATENT DOCUMENTS

| 2,943,691 | A | | 7/1960 | Kramer | |
| 2,979,138 | A | * | 4/1961 | Martensen | ............. A01B 21/08 |
| | | | | | 172/627 |
| 2,991,836 | A | | 7/1961 | Swanson | |
| 3,047,075 | A | | 7/1962 | Frank | |
| 3,072,424 | A | | 1/1963 | Mayne et al. | |
| 3,314,728 | A | * | 4/1967 | Cross | ...................... B60B 15/28 |
| | | | | | 301/53.5 |
| 3,562,968 | A | | 2/1971 | Johnson et al. | |
| 3,644,002 | A | * | 2/1972 | Barth | ...................... B60B 15/28 |
| | | | | | 301/53.5 |
| 3,774,970 | A | * | 11/1973 | Murphy | .................. B60B 15/28 |
| | | | | | 301/53.5 |
| 4,499,747 | A | | 2/1985 | Ewers | |
| 6,543,210 | B2 | | 4/2003 | Rostoucher et al. | |
| 7,380,645 | B1 | | 6/2008 | Ruiz | |
| 7,721,815 | B2 | | 5/2010 | Hoffman et al. | |
| 8,662,195 | B2 | * | 3/2014 | Hicks | ..................... A01B 21/08 |
| | | | | | 172/612 |
| 8,714,276 | B2 | | 5/2014 | Hake et al. | |
| 9,752,647 | B2 | * | 9/2017 | Röckl | ................... F16F 15/324 |
| D821,451 | S | * | 6/2018 | Paterson | ........................ D15/28 |
| 10,323,704 | B2 | * | 6/2019 | Huang | .................. F16D 65/121 |
| D856,377 | S | * | 8/2019 | Ainge | ............................. D15/28 |
| D856,382 | S | | 8/2019 | Ainge | |
| 10,405,472 | B2 | * | 9/2019 | Ainge | ..................... A01B 21/08 |
| D864,258 | S | | 10/2019 | Andrews | |
| D915,471 | S | | 4/2021 | Paterson | |
| 11,337,353 | B2 | * | 5/2022 | Ainge | ..................... A01B 21/08 |
| 2008/0036288 | A1 | | 2/2008 | Lund | |
| 2008/0314606 | A1 | | 12/2008 | Kelly | |
| 2011/0192330 | A1 | | 8/2011 | Logan | |
| 2011/0203818 | A1 | | 8/2011 | Hicks et al. | |
| 2015/0271981 | A1 | | 10/2015 | Degelman | |
| 2017/0013770 | A1 | | 1/2017 | Ainge | |
| 2019/0101174 | A1 | | 4/2019 | Huang | |
| 2021/0051833 | A1 | | 2/2021 | Ainge et al. | |

FOREIGN PATENT DOCUMENTS

| WO | 2016201486 A1 | 12/2016 | |
| WO | WO-2019036772 A1 * | 2/2019 | ............. A01B 21/08 |

OTHER PUBLICATIONS

Supplementary European Search Report received in European Application No. EP18847798A completed Mar. 25, 2021.

International Search Report and Written Opinion received for PCT/AU2018/050910, dated Nov. 16, 2018.

* cited by examiner

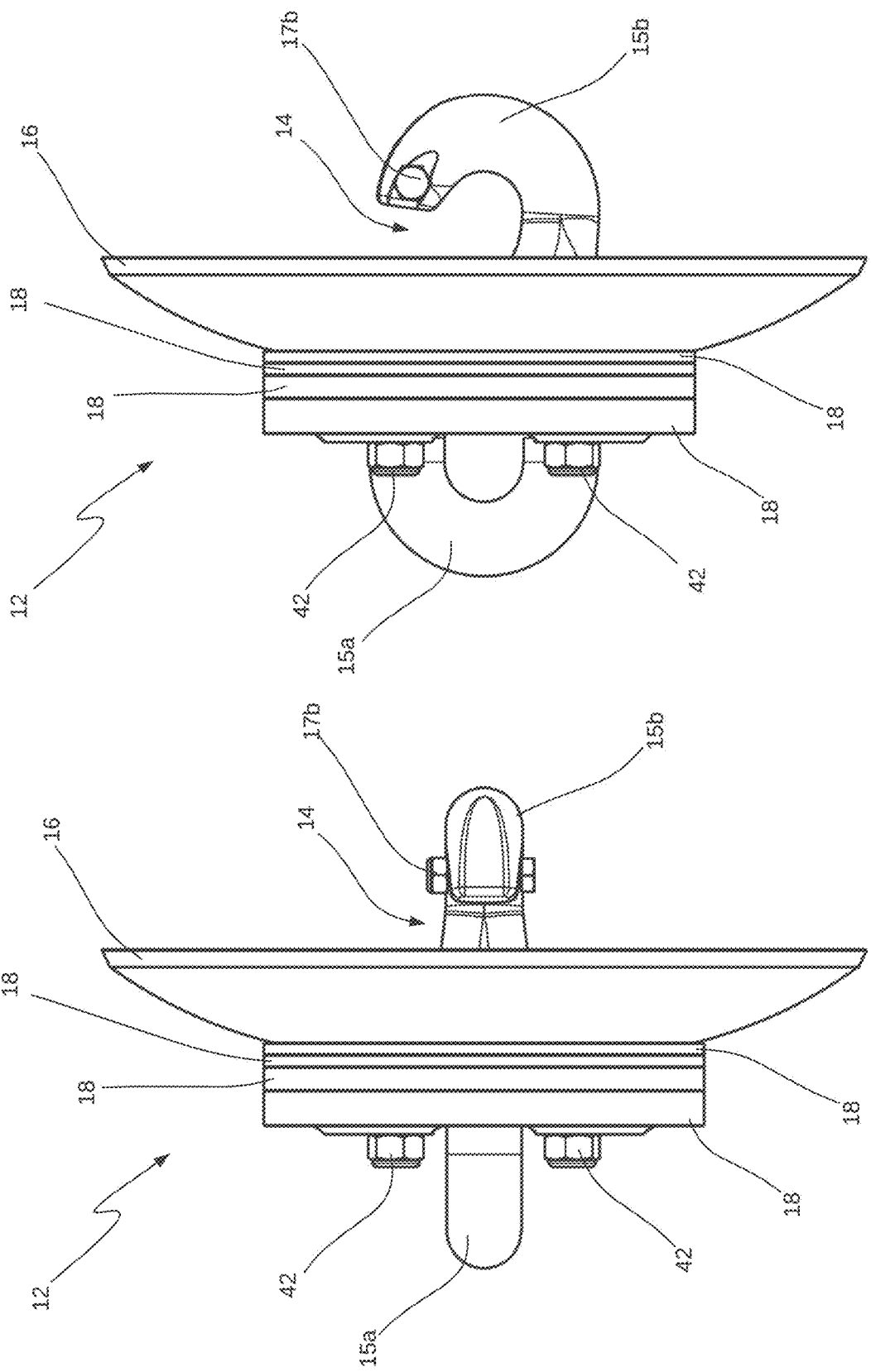

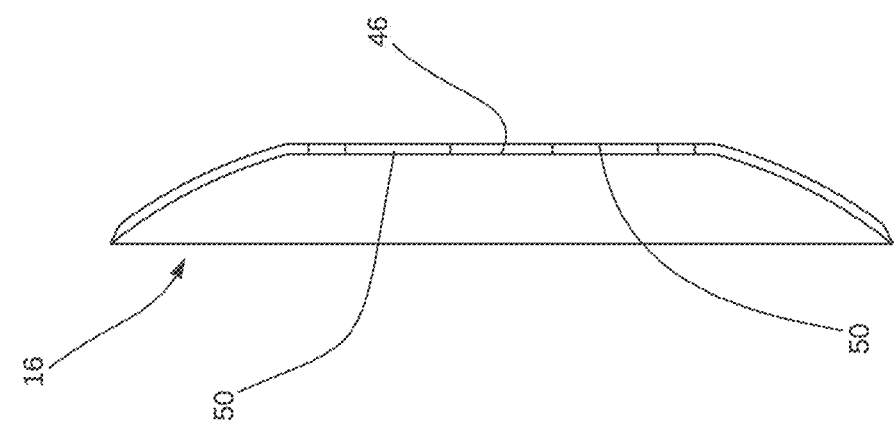
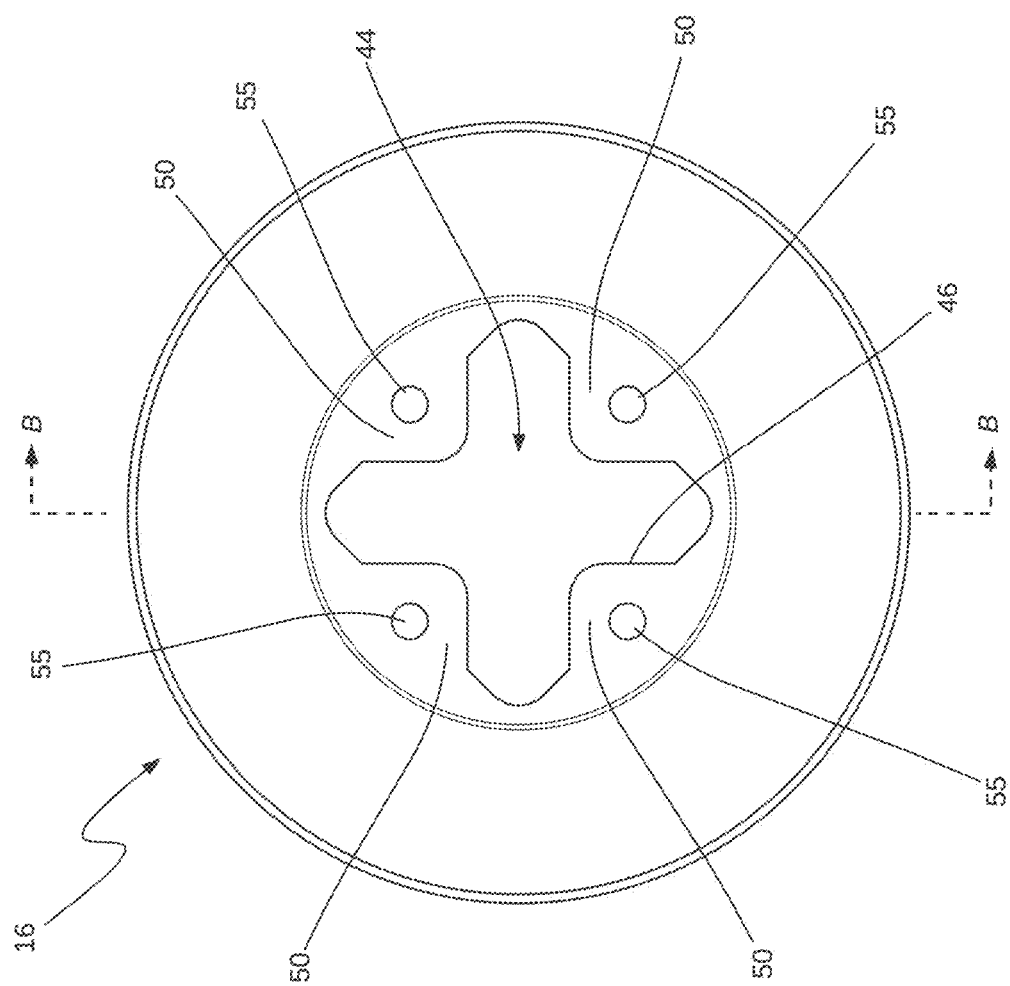

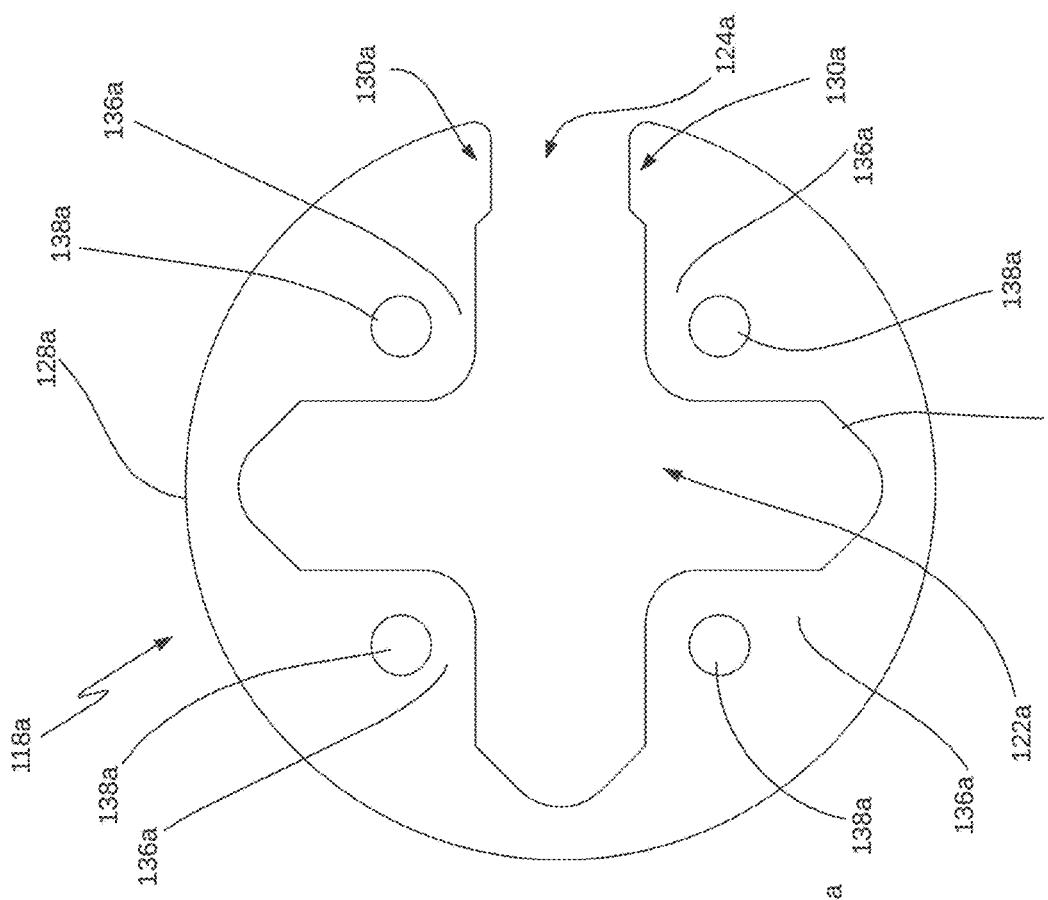
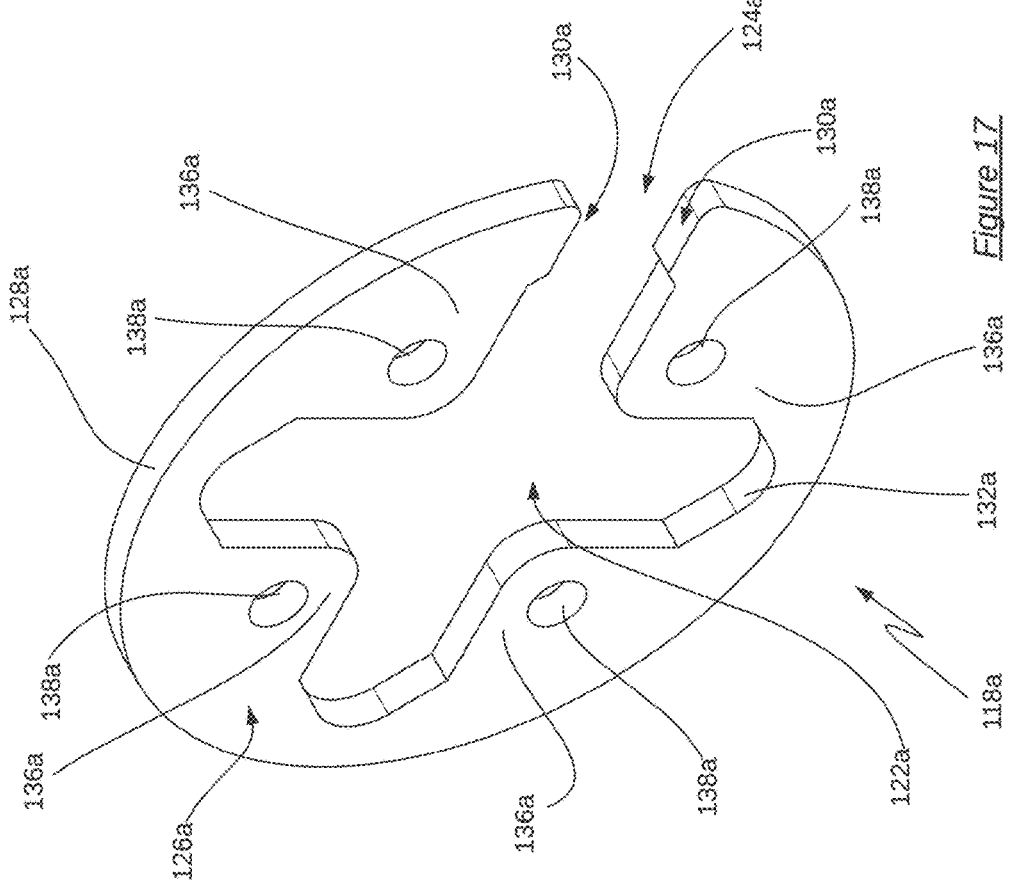

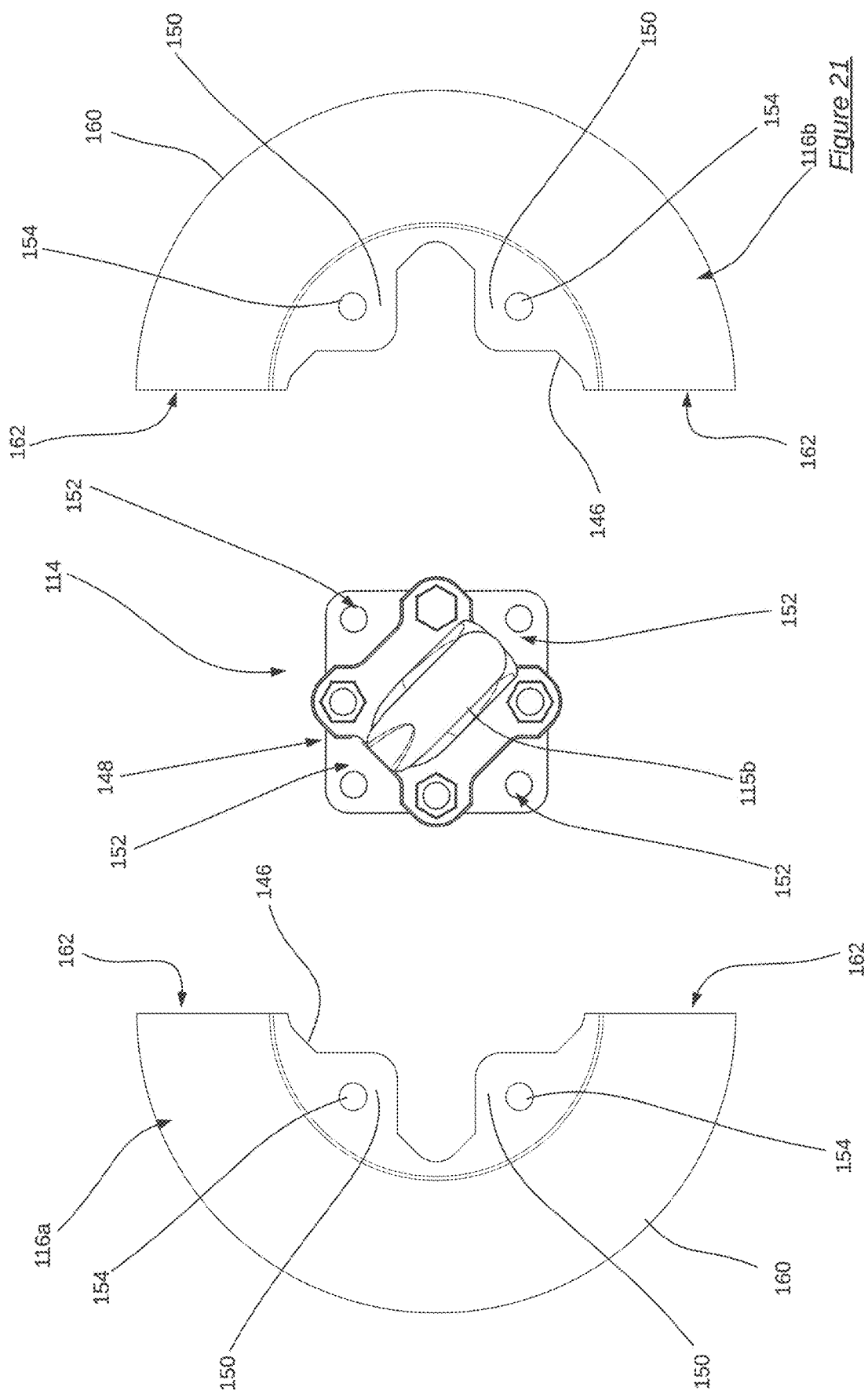

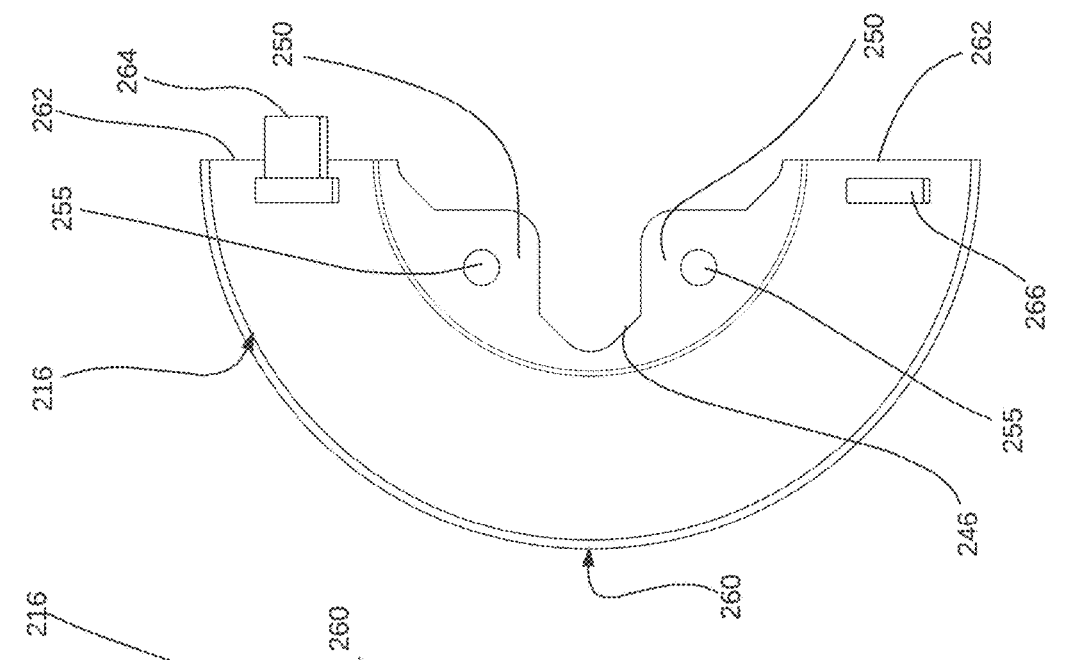
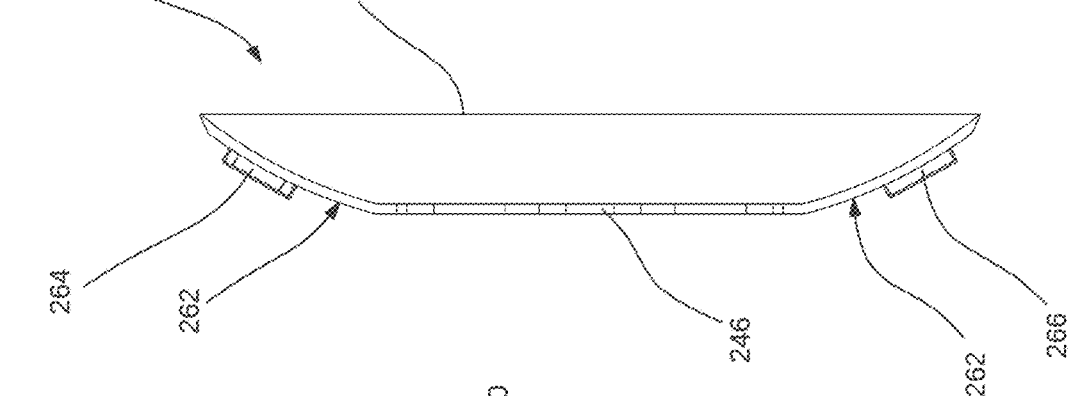
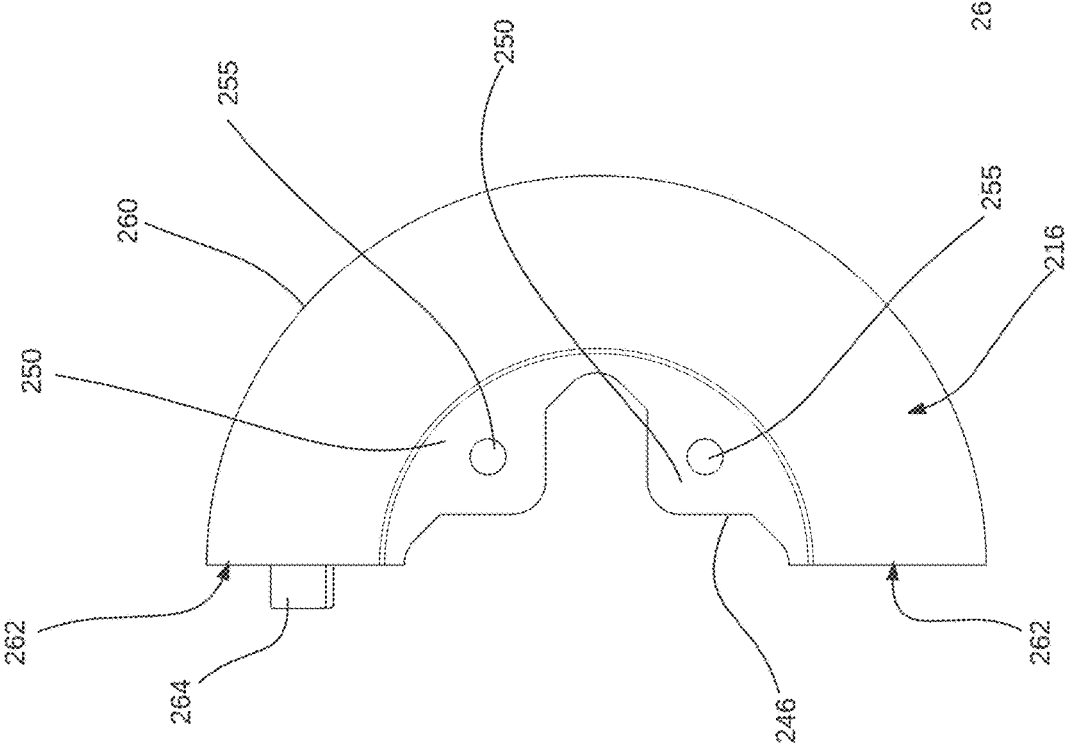

AGRICULTURAL TILLING SYSTEM AND COMPONENTS

CROSS REFERENCE TO RELATED APPLICATIONS

This patent application is a continuation of, and claims 35 USC 120 priority from, U.S. patent application Ser. No. 16/641,150, which is the National Stage Entry of International Application No. PCT/AU2018/050910. The application claims priority from Australian Patent Application No. 2017903411 filed Aug. 24, 2017, and Australian Patent Applications Nos. 2017903706, 2017903707, 2017903708, 2017903709 filed Sep. 12, 2017. The above applications are incorporated by reference herein.

BACKGROUND

The present invention relates to an agricultural tilling assembly. The present invention also relates to components of an agricultural tilling assembly.

Growing agricultural crops requires careful management of the soil in order to maximise crop yield. To this end, well prepared soil enables effective water penetration to the seeds and roots, and the roots are able to grow through the soil with ease. Tilling prepares the soil before seed is cast for sowing. Harrowing equipment works the topsoil, typically breaking up clods, and also root beds of previous crops (in other words, stubble), and/or weeds. The intent of harrowing is to disturb the topsoil so as to provide a fine particulate layer within which to be able to sow seeds, but not to disturb subsoil layers.

Overly aggressive harrowing results in the subsoil being mixed into the topsoil, which is not ideal for crop yield. Harrowing too lightly will be ineffective in breaking up clods in the topsoil.

While a variety of types of modern agricultural harrows are used, these all use sets of ground engaging tools that are shaped to tear and/or cut the soil as the harrow is pulled across the field. Typically, the depth of ground penetration is determined by three factors: soil characteristics, the cutting efficacy of the ground engaging tools, and the self weight of those tools/harrow. In this regard, most harrows rely on self weight of the tools and supporting structures, rather than an applied downward pressure, to influence depth of ground penetration.

Moisture content in soil can cause significant changes in soil characteristics, which affects the ability of the ground engaging tools to break up clods. Moisture content can vary dramatically from one season to another, and also change on a daily basis. As will be appreciated, the ability of a farmer to control the depth of ground penetration is limited to managing the cutting efficacy and, if the harrow permits it, the self weight of the harrow.

An agricultural harrow typically has its greatest cutting efficacy when new. Over time, the ground engaging tools wear and/or are damaged by impact with hard objects in the soil, both of which reduce the cutting efficacy. In many instances, the only control that a farmer has on the cutting efficacy is when to replace individual ground engaging tools. Each individual harrow can have hundreds of individual ground engaging tools, so replacing these tools can be an involved and laborious process.

Attempts have been made to provide harrows with the capacity to increase the weight, if desired, and thus increase the ground penetration. These harrows have not been widely adopted, at least in the additional weights are There is a need to address the above, and/or at least provide a useful alternative.

SUMMARY

There is provided an agricultural tilling assembly comprising an elongate structure, and at least one ground engaging tool sub-assembly that is secured to or within the elongate structure, the sub-assembly including:
  a hub having a mounting portion;
  a ground engaging tool that is arranged to be secured to the hub or integrally formed therewith; and
  a weight plate having a body with an open aperture formed with a mouth, the mouth being configured to enable the weight plate to be threaded over the elongate structure so that the elongate structure extends through the open aperture, and the open aperture being configured so that the weight plate in at least a first orientation can be thereafter maneuvered over at least a portion of a length of the hub whilst in situ on the elongate structure and to be locatable on the mounting portion.

In at least some embodiments, the mounting portion defines a maximum cross-sectional profile the hub in the elongate direction of the elongate structure, the weight plate being configured so as to be maneuvered lengthwise along the maximum cross-sectional profile.

The open aperture in the weight plate has preferably substantially the same shape, although slightly larger in size, than the maximum cross-sectional profile of the mounting portion. Accordingly, in at least the first orientation, the weight plate can be moved over the length of the hub into position on the mounting portion.

Preferably, the maximum cross-section profile of the hub and the open aperture of the weight plate adopt a generally x-shape.

There is provided a weight for use in an agricultural tilling assembly that has an elongate structure, and at least one ground engaging tool sub-assembly that is secured to or within the elongate structure, the sub-assembly including a hub having a mounting portion, and a ground engaging tool that is arranged to be secured to the hub or integrally formed therewith, the weight comprising:
  two major faces that are spaced apart by a peripheral edge surface, each major face being a generally annular sector of at least 180° so as to define a gap between two circumferential end portions of the peripheral edge surface, and an inner cavity that is defined by a radially inward portion of that peripheral edge surface, such that the weight can be located around an article by passing the article through the gap and into the inner cavity,
  wherein the width of the gap is less than the largest diameter of the inner cavity.

Alternatively or additionally, there is provided a weight for use in an agricultural tilling assembly that has an elongate structure, and at least one ground engaging tool sub-assembly that is secured to the elongate structure, the sub-assembly including a hub having a mounting portion, and a ground engaging tool that is arranged to be secured to the hub or integrally formed therewith, the weight comprising:
  two major faces that are spaced apart by a peripheral edge surface, a radially inward portion of that peripheral edge surface being non-circular and shaped to locate against an outer edge surface of the mounting portion of the hub, the outer edge surface being non-circular and at least partly complementary to the radially inward portion, wherein, when the weight is located on the mounting portion, the weight is rotationally fixed relative to the hub.

Alternatively or additionally, there is provided a weight for use in an agricultural tilling assembly that has an elongate structure, the weight comprising two major faces that are spaced apart by a peripheral edge surface that has a radially inward portion, wherein the radially inward portion of the peripheral edge surface has reflection symmetry along a single axis, and is rotationally asymmetrical.

In some embodiments, the weight includes one or more through holes through which to pass a fastener to secure the weight to the hub of the sub-assembly.

There is provided an agricultural tilling assembly comprising an elongate structure, and at least one ground engaging tool sub-assembly that is secured to or within the elongate structure, the sub-assembly including:

a hub having a mounting portion;
at least one ground engaging tool that is arranged to be secured to the hub or integrally formed therewith; and
one or more weight plates as previously described.

The radially inward portion of the peripheral edge surface can include one or more inwardly projecting lobes. In embodiments in which the weight includes one or more through holes through which to pass a fastener to secure the weight to the hub of the sub-assembly, each through holes can be formed in a respective one of the lobes.

There is also provided a method of increasing the weight of an agricultural tillage assembly that has:

an elongate structure;
a plurality of ground engaging tools that are mounted on the elongate structure, and are spaced apart in the elongate direction of the structure; and
retaining members that are each supported on or within one of the elongate structure and the ground engaging tools, the method involving:
moving the weight radially inwardly with respect to the elongate structure;
positioning the weight relative to a respective one of the retaining members; and
operating the respective retaining member to secure the weight to the assembly.

In some embodiments, each retaining member includes a hub and one or more fasteners, and the method may involve securing the fasteners to the hub to thereby secure the weight to the assembly.

The method may further involve loosening or removing the fasteners prior to the step of positioning the weight relative to the respective retaining member.

There is also provided a method of decreasing the weight of an agricultural tillage assembly that has:

an elongate structure;
a plurality of ground engaging tools that are mounted on the elongate structure, and are spaced apart in the elongate direction of the structure; and
retaining members that are each supported on or within one of the elongate structure and the ground engaging tools, at least one of the retaining members having at least weight retained thereto, the method involving:
releasing the respective retaining member, and
withdrawing the weight from the elongate structure involving movement of the weight in a radially outward direction with respect to the elongate structure.

In embodiments in which the retaining member has a plurality of weights retained thereto, the method may further involve operating the respective retaining member to secure remaining one or more weights to the assembly.

In some embodiments, each retaining member includes a hub and one or more fasteners, and the method may involve securing the fasteners to the hub.

There is provided an agricultural tilling assembly, the tilling assembly including a plurality of interconnected hubs, each hub arranged for mounting at least one ground engaging tool thereto, and wherein each ground engaging tool is formed so that it can be connected to a respective one of the hubs of the tilling assembly whilst that hub is retained interconnected in situ on the tilling assembly, and without the necessity to remove any other ground engaging tool from the tilling assembly.

Preferably, each ground engaging tool is formed so as to be removable from a respective hub of the tilling assembly whilst that hub is retained interconnected in situ on the tilling assembly, and without the necessity to remove any other ground engaging tool from the tilling assembly.

Preferably, the tilling assembly includes a support frame, and the interconnected hubs are arranged in one or more sets of hubs on the tilling assembly, wherein each set forms an elongate structure that is mounted at opposing ends to the support frame in a manner that enables the ground engaging tools to rotate in use of the tilling assembly.

There is also provided a ground engaging tool for mounting on a hub of an agricultural tilling assembly, the tool comprising:

a radially inner mounting portion that is to locate in abutment with the hub, the mounting portion having:
a generally annular sector shape so as to provide two circumferential end portions that each extend at least partly radially with respect to the hub, and
mounting formations for use in securing the mounting portion to the hub; and
one or more radially outer ground engaging portions that are supported on the inner mounting portion,
wherein the tool is mountable on the hub as one of a set of similar tools, and wherein, when the set of tools are mounted on the hub, the circumferential end portions of each tool are adjacent circumferential end portions of at least one other tool in the set.

In at least some embodiments, the ground engaging tool is configured to be secured to the hub with one other ground engaging tool. Thus, in such embodiments there are two tools in the set.

The ground engaging tool can further comprise a first circumferentially projecting connector, and a second connector that is shaped to co-operate with the first circumferentially projecting connector, wherein, when the ground engaging tool is secured to the hub with at least one other tool, the first connector of each tool is positioned adjacent the second connector of the other tool.

In some embodiments, the second connector is a through hole, and the first connector includes a through hole, wherein, when the ground engaging tool is secured to the hub with at least one other tool, the through holes of the first and second connectors of adjacent tools are aligned so as to permit a fastener to be passed through the aligned through holes.

Alternatively or additionally, the second connector is a keeper that is shaped to receive the first connector, wherein, when the ground engaging tool is secured to the hub with at least one other tool, the first connector is located within the keeper of the other tool.

In some embodiments, the radially outer ground engaging portion is a disc portion that has a radially outward facing blade edge that engages the ground, and wherein the disc portion has two circumferential end portions.

The blade edge can extend continuously between the two circumferential end portions of the disc portion. The blade edge can define a circular arc. Alternatively, the blade edge can define a scalloped arc.

Preferably, each of the circumferential end portions of the inner mounting portion is continuous with one of the circumferential end portions of the outer ground engaging portions.

There is also provided a ground engaging tool for mounting on a hub of an elongate agricultural tilling assembly, the tool comprising:
- a mounting portion that has a generally annular shape that defines a radially inner edge that is to locate about the hub, and a radially outer edge portion that is at least part of the radially outer peripheral edge of the tool, and mounting formations for use in securing the mounting portion to the hub; and
- one or more radially outer ground engaging portions that are supported on the mounting portion, and also form at least part of the radially outer peripheral edge of the tool,
- wherein the tool is formed with a slit that extends between the radially inner edge and the radially outer edge portion,
- and wherein the mounting portion and/or the ground engaging tool is resiliently deflectable to adopt a configuration in which the slit is opened to thereby allow the tool to pass over a part of the elongate agricultural tilling assembly.

In some embodiments, the tool is formed with a second slit that extends from the radially inner edge to a terminal end that is spaced from the radially outer edge portion of the tool. Preferably, the terminal end of the second slit includes a stress-relieving formation.

In some embodiments, the ground engaging tool is generally disc shaped such that the radially outer ground engaging portion is a radially outward facing blade edge that engages the ground.

The blade edge can extend continuously between the two circumferential end portions of the disc portion. The blade edge can define a circular arc. Alternatively, the blade edge can define a scalloped arc.

In some embodiments, the mounting portion defines a radially inner edge that is non-circular,
- whereby when the ground engaging tool is mounted to the hub, the radially inner edge abuts a complementary shaped portion of the hub to thereby inhibit relative rotation of the tool on the hub.

In certain embodiments, the mounting portion includes one or more inwardly projecting lobes that are to locate within a radially outward oriented rebates. Alternatively or additionally, the radially inner edge of the mounting portion can include two or more points of inflection.

The mounting portion can include one or more apertures through which to pass a fastener for use in securing the ground engaging tool to the hub.

There is provided an agricultural tilling assembly, the tilling assembly including:
- a plurality of interconnected hubs; and
- a plurality of ground engaging tools as previously described, each tool being secured to one of the hubs.

Preferably, the tilling assembly includes a support frame, and the interconnected hubs are arranged in one or more sets of hubs on the tilling assembly, wherein each set forms an elongate structure that is mounted at opposing ends to the support frame in a manner that enables the ground engaging tools to rotate in use of the tilling assembly.

There is also provided a method of removing a ground engaging tool from an agricultural tillage assembly that has:
- an elongate structure, and
- a plurality of retaining members that are supported on or within the elongate structure and are spaced apart in the elongate direction of the structure, each retaining member being configured to retain one or more ground engaging tools thereto and wherein the ground engaging tool is retained to a respective one of retaining members, the method involving:

releasing the respective retaining member, and
withdrawing the ground engaging tool from the elongate structure involving movement of the tool in a radially outward direction with respect to the elongate structure.

There is also provided a method of securing a ground engaging tool to an agricultural tillage assembly that has:
- an elongate structure, and
- a plurality of retaining members that are supported on or within the elongate structure and are spaced apart in the elongate direction of the structure, each retaining member being configured to retain one or more ground engaging tools thereto and wherein the ground engaging tool is retained to a respective one of retaining members, the method involving:

moving the ground engaging tool radially inwardly with respect to the elongate structure;
positioning the ground engaging tool relative to a respective one of the retaining members; and
operating the respective retaining member to secure the tool to the assembly.

There is also provided a hub for an elongate ground engaging assembly, the hub having:
- one or more interconnecting elements for assembling the hub with one or more other hubs to form the assembly,
- a first mount to which a ground engaging tool is to be mounted, and
- a second mount to which one or more weights are mountable,
- wherein the hub is arranged so that the second mount is accessible independently of the first mount, such that weights are mountable to and removable from the hub while a ground engaging tool is located at the first mount, and such that the ground engaging tool is mountable to and removable from the hub while the weights are located at the second mount.

In some embodiments, the hub has shaft, and a plurality of first mounts that are spaced apart along the shaft, wherein ground engaging tools are mounted or mountable to respective first mounts.

There is provided a hub for an agricultural tilling assembly, the hub having a first face against which to mount a ground engaging tool that has a non-circular aperture, the hub being formed with an outer peripheral edge that is complementary of the non-circular aperture,
- whereby in at least one first orientation of the ground engaging tool relative to the hub, the hub can pass through the non-circular aperture, and
- whereby in at least one second orientation of the ground engaging tool relative to the hub, the hub and ground engaging tool interfere to prevent the hub passing through the non-circular aperture.

Thus, the hub being formed so that in at least one first orientation of the ground engaging tool relative to the hub, the hub can pass through the aperture in the ground engaging tool so as to ground engaging tool the blade to pass over the hub whilst the hub remains in situ mounted on the assembly. In at least one second orientation of the ground engaging tool relative to the hub, the hub cannot pass through the aperture in the ground engaging tool.

The ground engaging tool is preferably arranged to be secured to the hub in the second orientation.

Preferably, the peripheral edge of the first face defines the outer peripheral edge of the hub.

Preferably, the aperture in the ground engaging tool is sized so as to be slightly larger than the outer peripheral edge.

There is provided a hub for an agricultural tillage assembly that has an elongate structure on which to mount a plurality of like hubs, the hub being formed so as to be mountable on the elongate structure without the necessity to remove any in situ hubs already mounted on the elongate structure, the hub being configured to secure at least one ground engaging tool thereto.

There is provided a hub for an agricultural tillage assembly that has an elongate structure on which to mount a plurality of like hubs, the hub comprising at least two separable parts, each separable part including:
   an abutment face that has a recessed portion into which to receive the elongate structure;
   a mounting face; and
   first and second retaining formations,
   wherein, in use of the hub:
   the two separable parts are positioned with the abutment faces facing one another, the mounting faces adjacent one another, and the elongate structure located within the recessed portions,
   the first retaining formations are used in securing the separable parts to one another, and
   the second retaining formations are used in securing a ground engaging tool against the mounting face.

In at least some embodiments, the two separable parts are identical in shape.

Preferably, the hub further comprises one or more first fasteners that co-operate with the first retaining formations to secure the separable parts to one another. The first retaining formations in each separable part can include one or more first holes, and the first fasteners can each include a bolt, wherein the shank of the bolt is to pass into or through the first holes. In some embodiments, each separable part includes two first formations that each include a through hole, and a nut-shaped recess to receive a nut or the head of the bolt.

In certain embodiments, each recessed portion is configured such that tensioning the first fasteners applies a clamping force to the elongate structure.

The abutment face of one or both separable parts can include engagement formations within the recessed portion, wherein, in use of the hub, the engagement formations engage the elongate structure and resist relative movement between the hub and elongate structure.

Preferably, the hub further comprises one or more second fasteners that co-operate with the second retaining formations to secure the ground engaging tool to the hub and against the mounting face. The second retaining formations in each separable part can include one or more second holes, and the second fasteners can each include a bolt, wherein the shank of the bolt is to pass into or through the second holes. In some embodiments, each separable part includes two second formations that each include a through hole, and a nut-shaped recess to receive a nut or the head of the bolt.

The mounting face of each separable part can be provided with one or more location formations to facilitate location of the ground engaging tool on the mounting faces relative to the second retaining formations.

In some embodiments, at least one of the separable parts further includes a third retaining formation, and the hub further comprises:
   a locking member that is configured to interengage with the third retaining formation;
   wherein, in use of the hub, a weight with a peripheral edge surface that defines an inner cavity is locatable around the hub, and the locking member brought into interengagement with the third retaining formations and operated to retain the weight in position on the hub.

Preferably, the locking member includes a clip that is configured to interengage with the third retaining formation, and one or more threaded fasteners that are operable to bear against the weight to thereby retain the weight in position on the hub. Preferably, the clip is C-shaped.

In certain embodiments, the clip includes spline formations, and the third retaining formations include complementary spline formations.

There is provided an agricultural tillage assembly comprising:
   an elongate structure;
   a plurality of hubs as previously described, the hubs being mounted on the elongate structure in a spaced apart manner along the elongate structure; and
   a plurality of ground engaging tools that are each secured against the mounting face of a respective one of the hubs.

In certain embodiments, the elongate structure can be one or more metal strands. The elongate structure can include connectors at opposing ends for connecting the assembly to the frame of a towable vehicle.

BRIEF DESCRIPTION OF THE DRAWINGS

In order that the invention may be more easily understood, embodiments will now be described, by way of examples only, with reference to the accompanying drawings, in which:

FIG. 4: is a first side view of the disc chain assembly of FIG. 3;

FIG. 5: is a second side view of the disc chain assembly of FIG. 3;

FIG. 14: is a front view of the disc of the disc chain assembly of FIG. 3;

FIG. 15: is a vertical section of the disc, as viewed along the line B-B in FIG. 14;

FIG. 17: is a perspective view of a first weight of the disc chain assembly of FIG. 16;

FIG. 18: is a front view of the weight shown in FIG. 17;

FIG. 21: is a schematic end view showing assembly of disc segments onto the hub of FIG. 16;

FIG. 22: is a front view of a segmented disc chain part according to a third embodiment of the present invention;

FIG. 23: is a side view of the segmented disc chain part of FIG. 22;

FIG. 24: is a rear view of the segmented disc chain part of FIG. 22;

DETAILED DESCRIPTION

Figure 1:
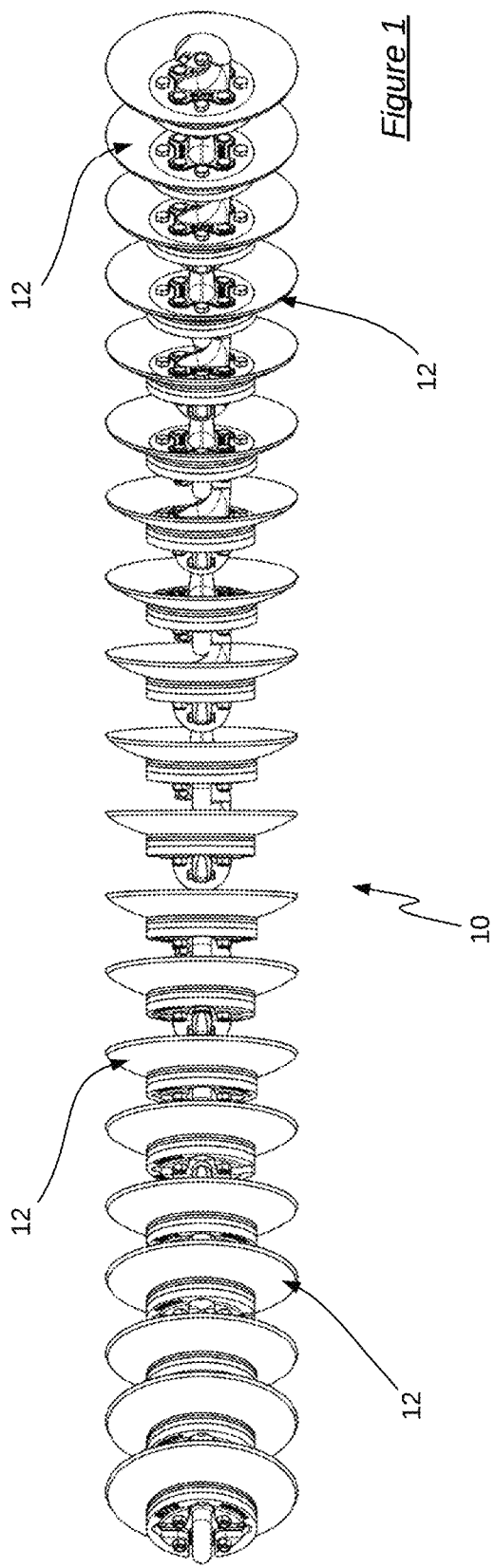
FIG. 1: is a side view of an agricultural disc chain harrow according to a first embodiment of the present invention.
Figure 2:
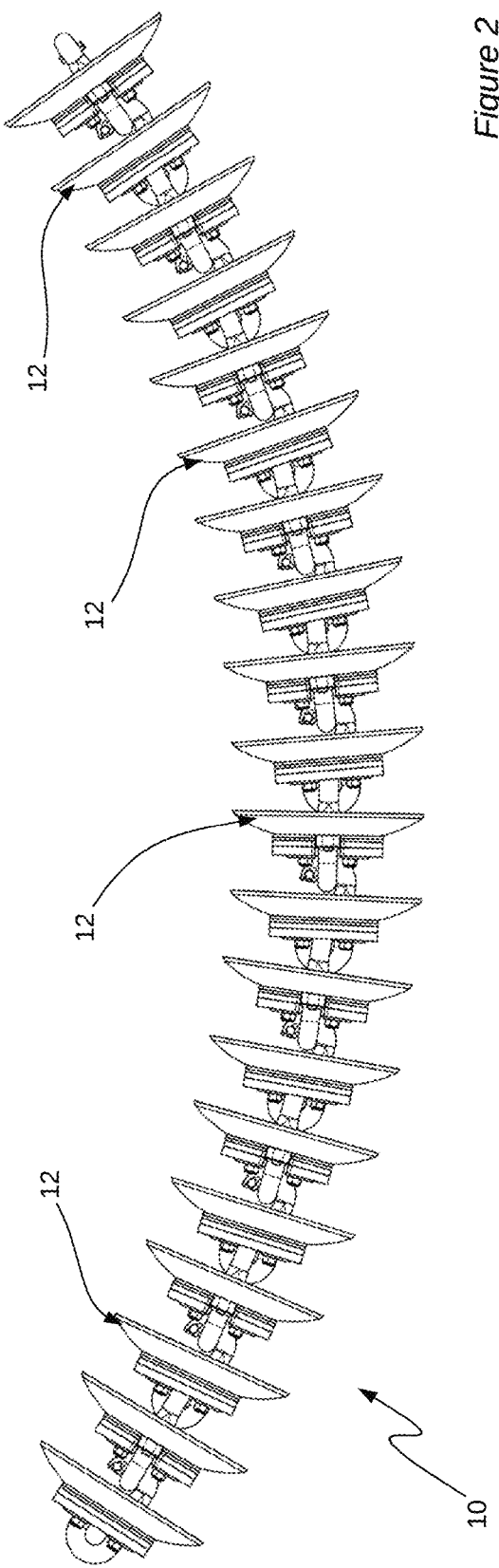
FIG. 2: is a plan view of the agricultural disc chain harrow of FIG. 1.
Figure 3:
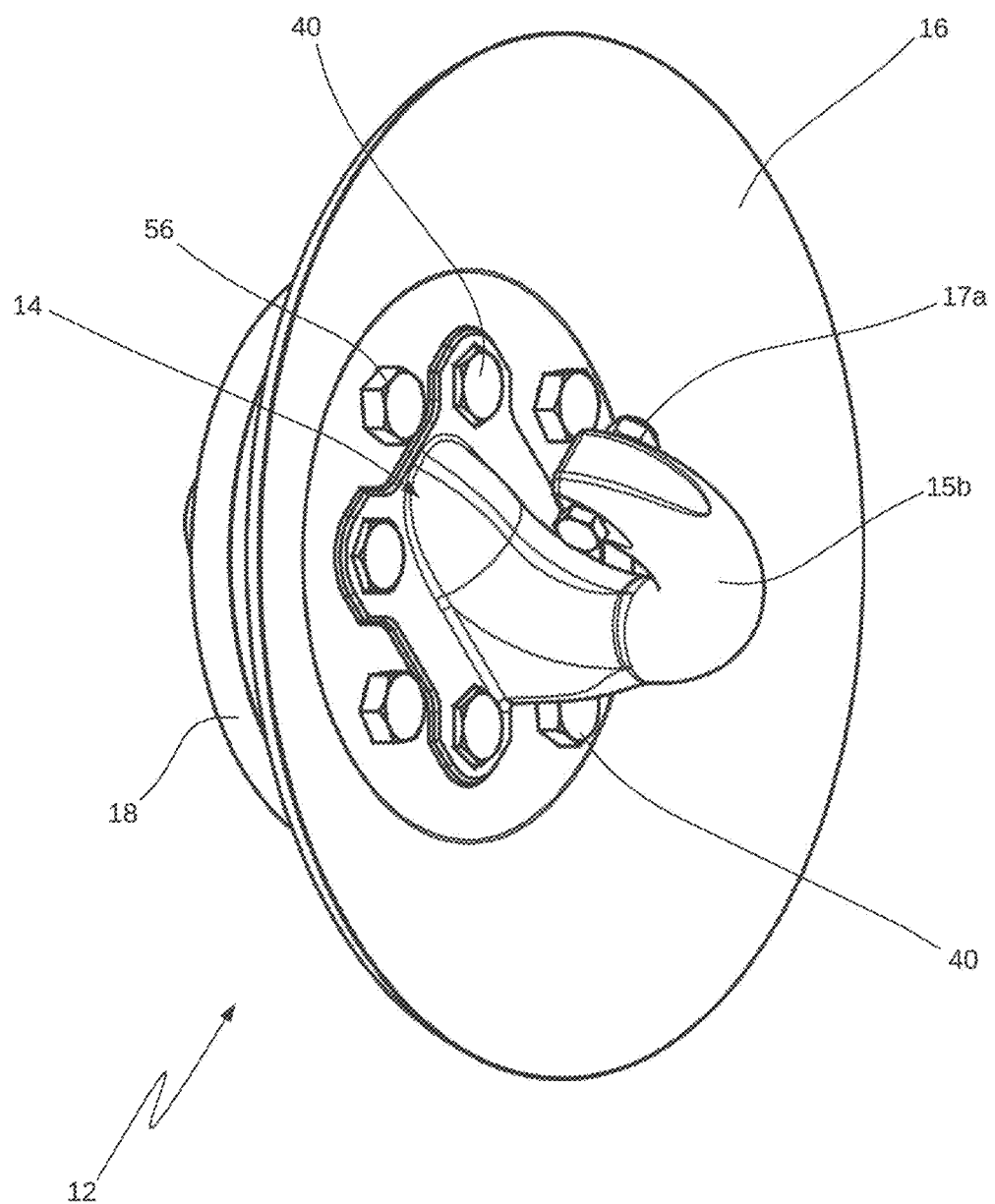
FIG. 3: is a front perspective view of one of the disc chain assemblies shown in FIG. 1.

FIGS. 1 and 2 show an agricultural tilling assembly in accordance with an embodiment of the invention. In this particular embodiment, the tilling assembly is an agricultural disc chain harrow 10. The disc chain harrow 10 has an elongate structure, and a number of ground engaging tool sub-assemblies 12 that, in this embodiment, are secured within the elongate structure. As will be appreciated from the description that follows, in this embodiment the ground engaging tool sub-assemblies 12 are assembled to form the elongate structure.

FIGS. 3 to 15 show one of the sub-assemblies 12, and its component parts, in detail. For simplicity, the description of these figures will generally refer to a single sub-assembly 12.

The sub-assembly 12 includes a hub 14, a ground engaging tool 16, and weights 18. The ground engaging tool 16 in these figures is a disc, however it will be understood that the invention is not limited to discs. In this example, the disc 16 is arranged to be releasably secured to the hub 14.

Figure 10:
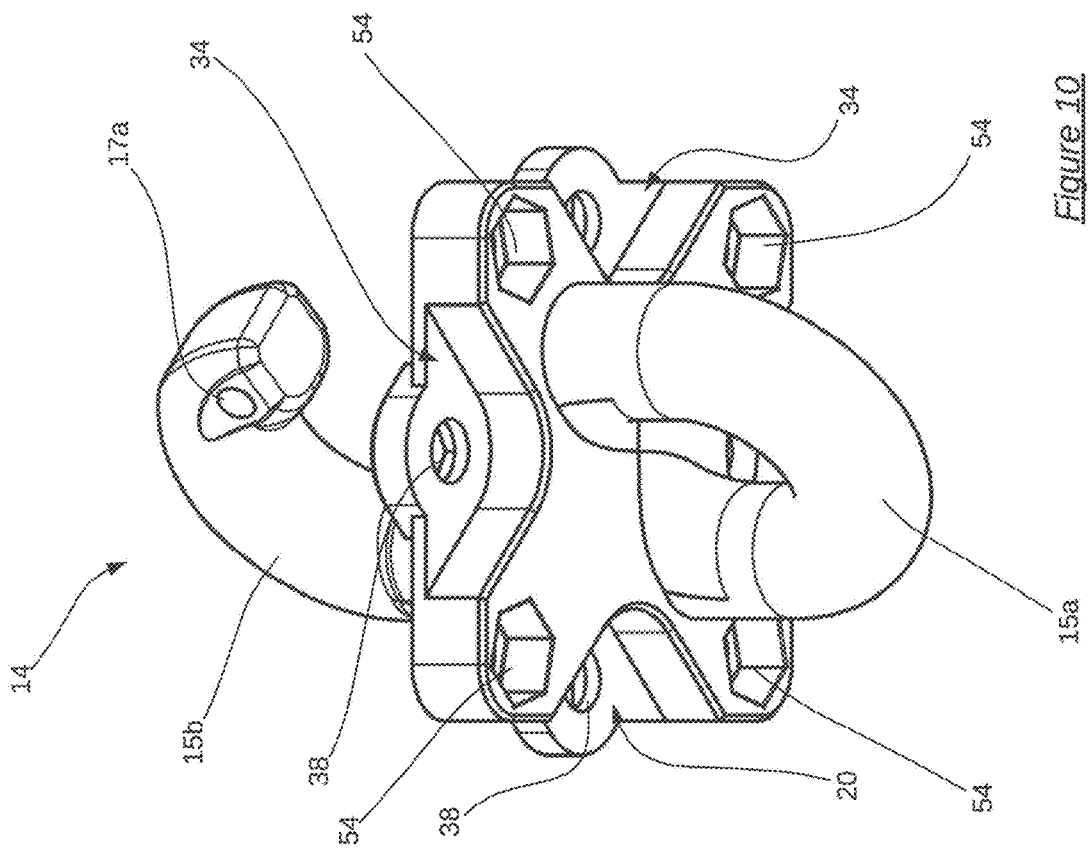
FIG. 10: is a rear perspective view of the hub of the disc chain assembly of FIG. 3.
Figure 9:
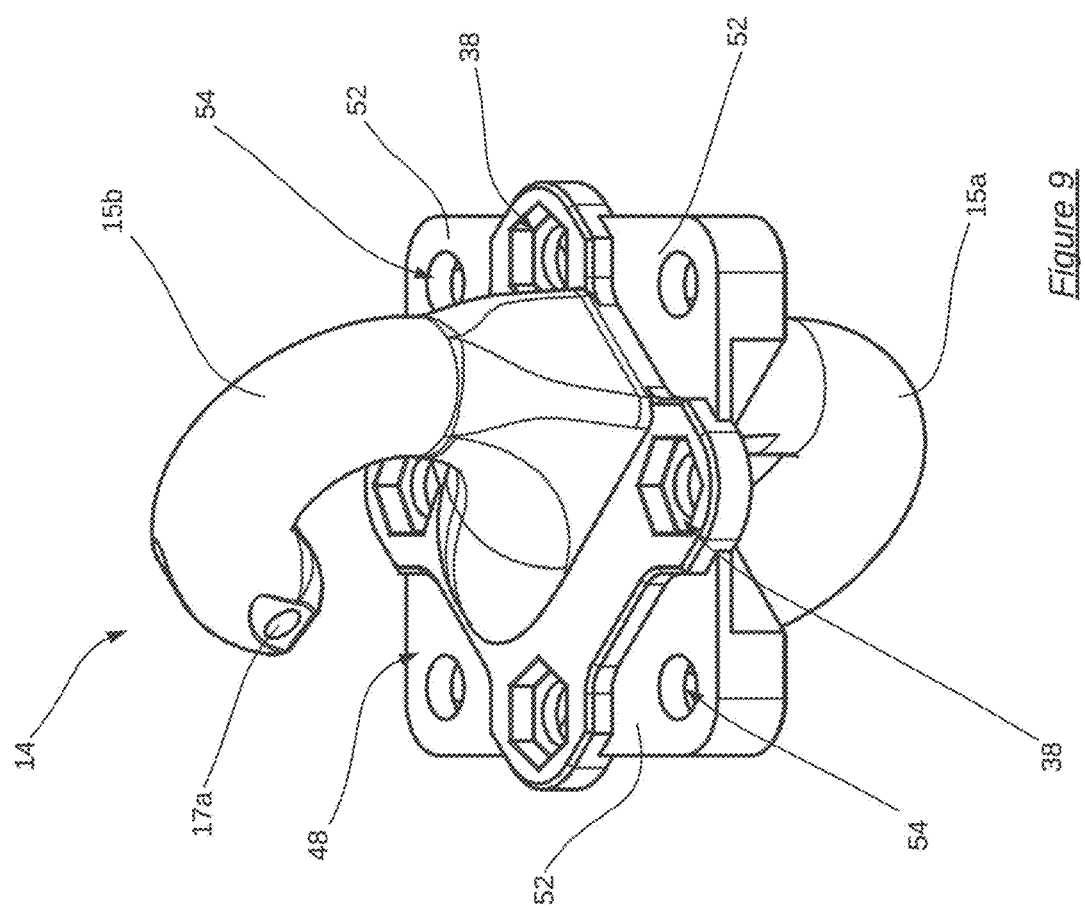
FIG. 9: is a front perspective view of the hub of the disc chain assembly of FIG. 3.

As shown in FIGS. 9 and 10, each hub 14 includes a hook 15b, and an eye 15a. The disc chain harrow 10 is assembled by interlinking the hooks and eyes 15b, 15a of adjacent hubs 14 in the harrow 10. In this particular embodiment, the hook 15b includes a transverse hole through 17a which to pass a fastener 17b. When installed, the fastener 17b prevents the end of the hook 15b disengaging from the eye 15a.

In use, disc chain harrow 10 is mounted to a harrow frame (not shown), which is towed behind a vehicle (such as a tractor, also not shown). The disc chain harrow 10 may be one of several assemblies that are mounted on the frame. The discs 16 are placed on the ground and then drawn over the ground. In this way, the discs engage the ground and will perform a harrowing function.

As shown in FIG. 10, the hub 14 has a weight mounting portion 20. In this particular embodiment, the assembly 12 is configured to mount up to four weights of differing mass. In the Figure, the assembly 12 is shown with a full complement of four weights 18.

Figure 11:
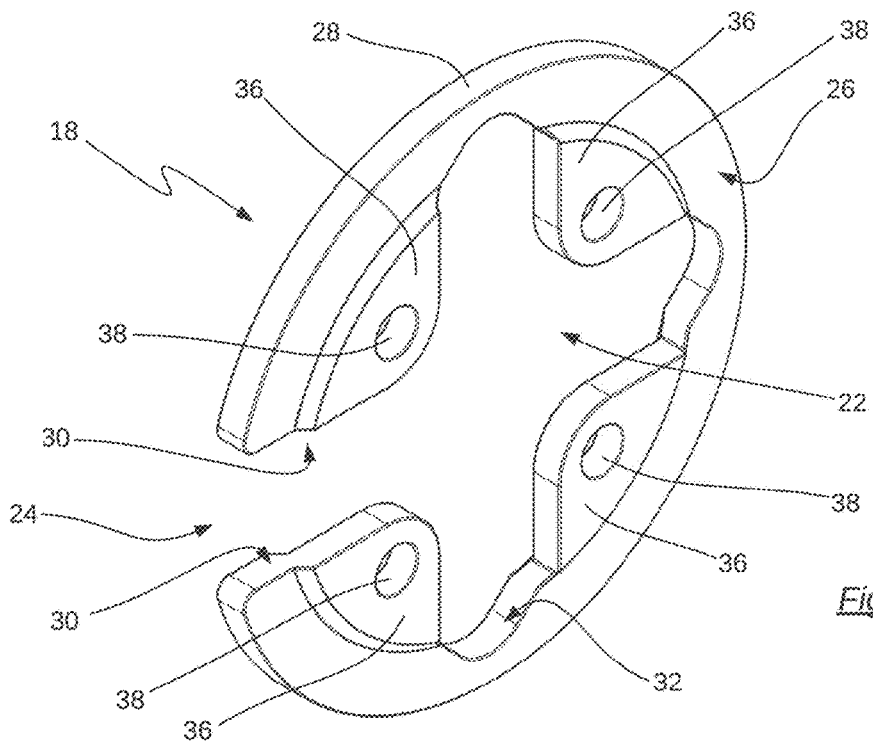
FIG. 11: is a rear perspective view of one of the weights of the disc chain assembly of FIG. 3.
Figure 12:
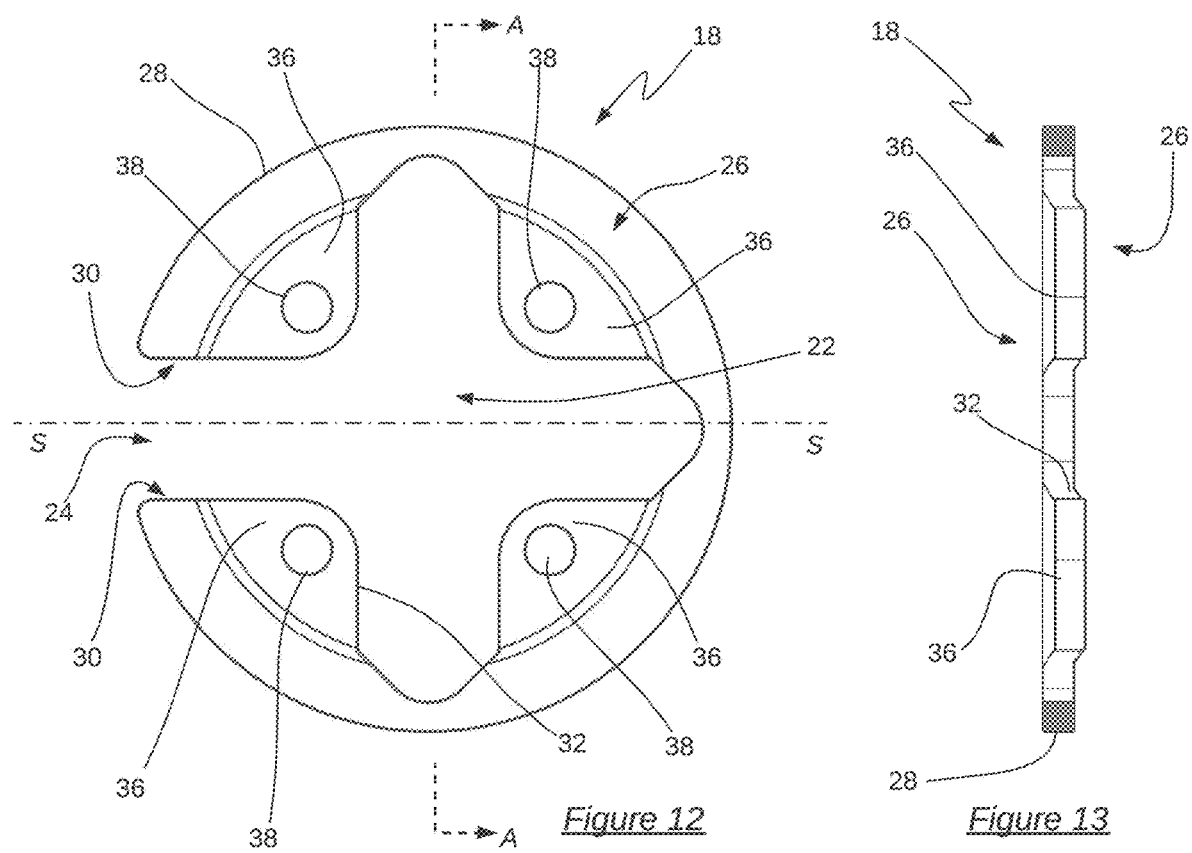
FIG. 12: is a front view of the weight shown in FIG. 11.
Figure 13:
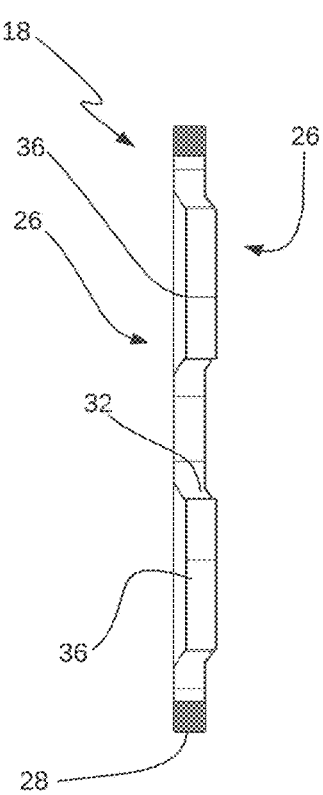
FIG. 13: is a vertical section of the weight, as viewed along the line A-A in FIG. 12.

FIGS. 11 to 13 show one of the weights 18 in detail. The weight 18 has a body with an open aperture (inner cavity 22) formed with a mouth (gap 24). The gap 24 provides a through way to the inner cavity 22. The gap 24 is configured to enable the weight 18 to be threaded over the elongate structure (in other words, passed or fed over the elongate structure), so that the elongate structure extends through, and is located within, the inner cavity 22. Further, the inner cavity 22 is configured so that the weight 18, in at least a first orientation relative to the elongate structure, and can be thereafter maneuvered over at least a portion of a length of the hub 14 whilst that hub 14 is in situ on the elongate structure. The weight 18 is then locatable on the mounting portions 20.

The ability to add or remove weights 18 from the harrow 10 without requiring partial or full disassembly of the harrow 10 is a significant benefit. If the ground penetration is observed to be insufficient, weights can be added relatively quickly. Conversely, if the harrow 10 is too aggressive, weights can be removed relatively quickly.

In the example of FIGS. 1 and 2, weights 18 can be threaded over the hooks and eyes 15b, 15a, and maneuvered into position for securing against the hub 14 on "eye side". In this way, weight can be added to the disc chain harrow 10, without requiring disassembly of the harrow 10 into its separate sub-assemblies 12. Conversely, weights 18 can be removed from the harrow 10 in situ, by a reversal of the installation procedure.

Each weight 18 has two major faces 26 that are spaced apart by a peripheral edge surface 28. Each major face 26 is a generally annular sector of at least 180°, so that the gap 24 is defined between two circumferential end portions 30a, 30b of the peripheral edge surface 28. The inner cavity 22 is defined by a radially inward portion 32 of that peripheral edge surface 28. The weight 18 is locatable around the hub 14 by passing the hub 14 through the gap 24 and into the inner cavity 22. As is particularly evident from FIG. 12, the width of the gap 24 is less than the largest diameter of the inner cavity 22.

The inner cavity 22 has a non-circular radially inward portion 32 of the peripheral edge surface 28. In this example, the radially inward portion 32 adopts a generally X-shape (in other words, cross shape), as shown in FIG. 12. When the weight 18 is located on the mounting portion 20, the weight 18 is rotationally fixed relative to the hub 14. As will be observed from FIG. 12, in this embodiment, the radially inward portion 32 of the peripheral edge surface 28 has reflection symmetry along a single axis (which is indicated by the line S-S in FIG. 12), and is also rotationally asymmetrical.

In this example, the weight mounting portion 20 includes four recessed portions 34. Each recessed portion 34 is shaped to receive one of four inwardly projecting lobes 36 that are formed by the radially inward portion 32. Between the recessed portions 32 and the eye 15a, the weight mounting portion 20 includes an outer surface with a shape that complements that of the peripheral edge surface 28. Each of the recessed portions 34 has a general V-shape, to receive the generally V-shaped lobe 36.

Figure 8:
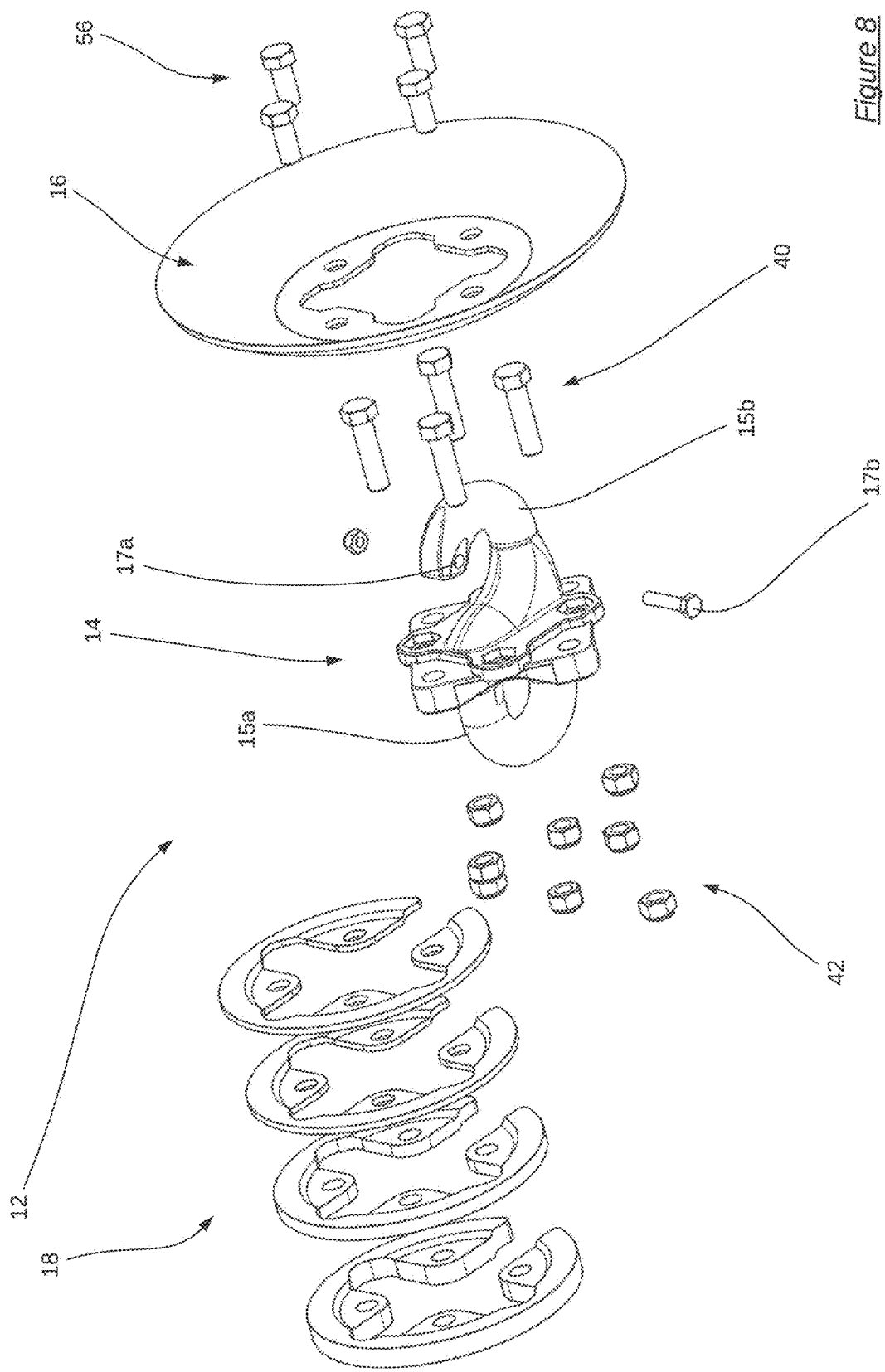
FIG. 8: is an exploded view of the disc chain assembly of FIG. 3.

The hub 14 includes four through holes 38 through which to pass bolts 40 to secure the weights 18 to the hub 14. As shown in FIG. 9, on the "hook-side" of the hub 14, each through hole 38 has a hexagonal recess to receive the head of one of the bolts 40. As shown in FIG. 8, the sub-assembly 12 includes nuts 42, four of which are to engage the bolts 40.

Figure 7:
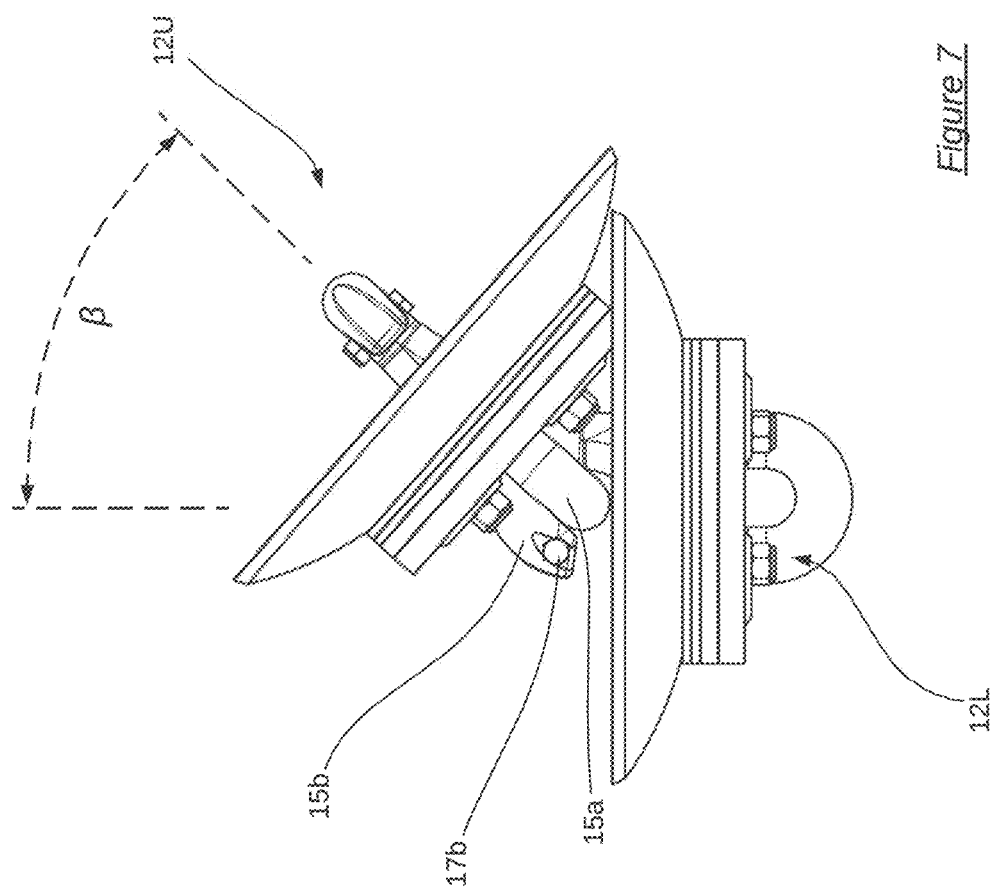
FIG. 7: is a second plan view of two connected disc chain assemblies of FIG. 3, showing possible range of relative pivoting movement of the two connected assemblies in a second plane.
Figure 6:
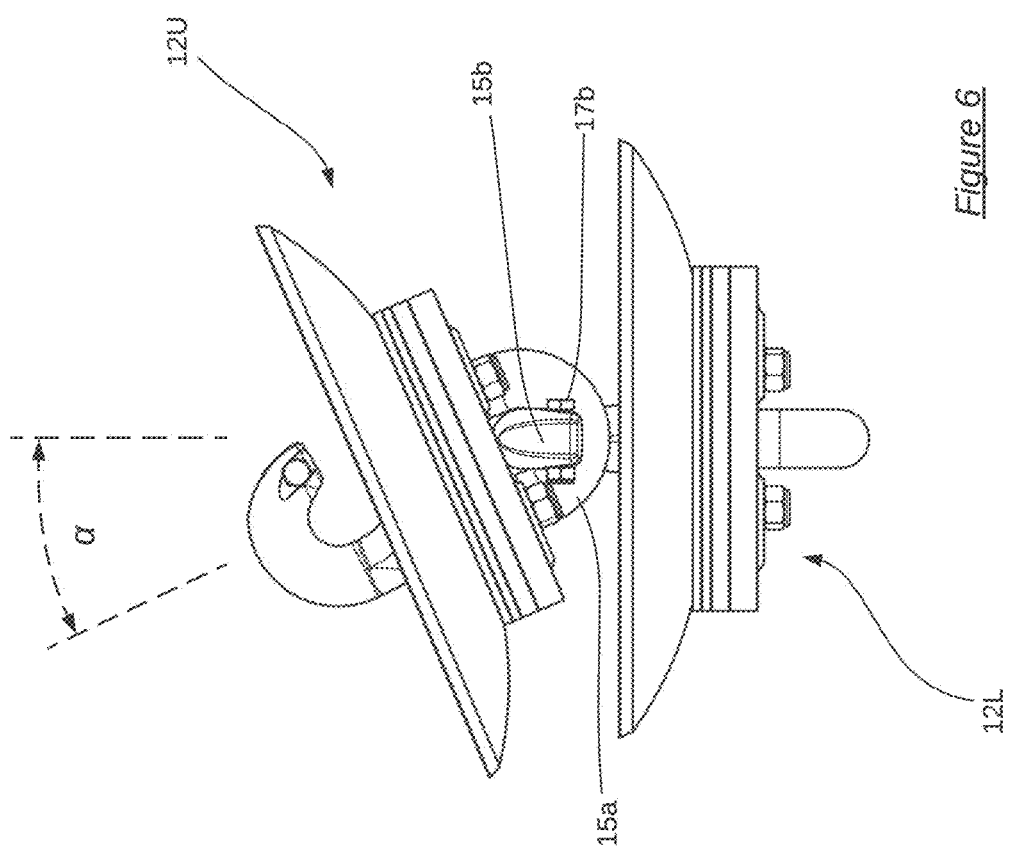
FIG. 6: is a first plan view of two connected disc chain assemblies of FIG. 3, showing possible range of relative pivoting movement of the two connected assemblies in a first plane.

As shown FIG. 13, the weights 18 are configured with the lobes 36 being offset from the radially outer peripheral edge surface 28. This offset enables the weight to be positioned up against the disc 16, when both are mounted to the hub. FIGS. 6 and 7 show an interconnected pair of disc sub-assemblies 12. In each of these Figures, the "upper" sub-assembly (designated as 12U) is pivoted relative to the "lower" sub-assembly (designated as 12L). FIG. 6 indicates angle α, which is smallest maximum pivot angle that can be achieved between two adjacent and interconnected sub-assemblies 12U, 12L before the two sub-assemblies interfere and block further movement in this particular plane. Angle α is approximately 25° to 30°. FIG. 7 indicates angle β, which is largest maximum pivot angle that can be achieved between two adjacent and interconnected sub-assemblies 12U, 12L before the two sub-assemblies interfere and block further movement in this particular plane. Angle β is approximately 40° to 45°.

FIGS. 14 and 15 show the disc 16 in detail. The disc 16 has a body with an aperture 44. In this example, the disc 16 is concave, and has a circular chisel edge blade. However, the concavity, peripheral shape, and edge formation is not specific to this invention.

The aperture 44 defines an inner peripheral edge 46. The disc 16 is locatable around a disc mounting portion 48 of the hub 14. The aperture 44 is non-circular and, in this particular example, adopts a generally X-shape (in other words, cross shape), as shown in FIG. 14.

The disc 16 includes four inwardly projecting lobes 50 that surround the aperture 44. Further, the disc mounting portion 48 includes four recessed portions 52 that are each shaped to receive one of the lobes 50. Each of the recessed portions 52 has a general V-shape, to receive the generally V-shaped lobe 50. Thus, when the disc 16 is located on the mounting portion 48, the disc 16 is rotationally fixed relative to the hub 14.

The hub 14 includes four through holes 54 within the disc mounting portion 38. Additionally, the disc 16 includes four through holes 55 through which to pass bolts 56 to secure the disc 16 to the hub 14. As shown in FIG. 9, on the "eye-side" of the hub 14, each through hole 54 has a hexagonal recess to receive one of the nuts 42 that is to mate with one of the bolts 40 used to secure the disc 16 to the hub 14.

The embodiment shown in FIGS. 1 to 15 has an elongate structure of the disc chain harrow is formed from interlinked hubs that can be separated, if desired. Discs are removably mounted to one side of the hubs, and weights are removably mounted to the opposing side of the hubs. In certain alternative embodiments, the discs can be permanently fixed to an elongate structure. For example, discs can be welded to, or otherwise permanently secured, to a chain. In such embodiments, the inner annular portion of the discs can provide a hub onto which weights can be secured.

Figure 16:
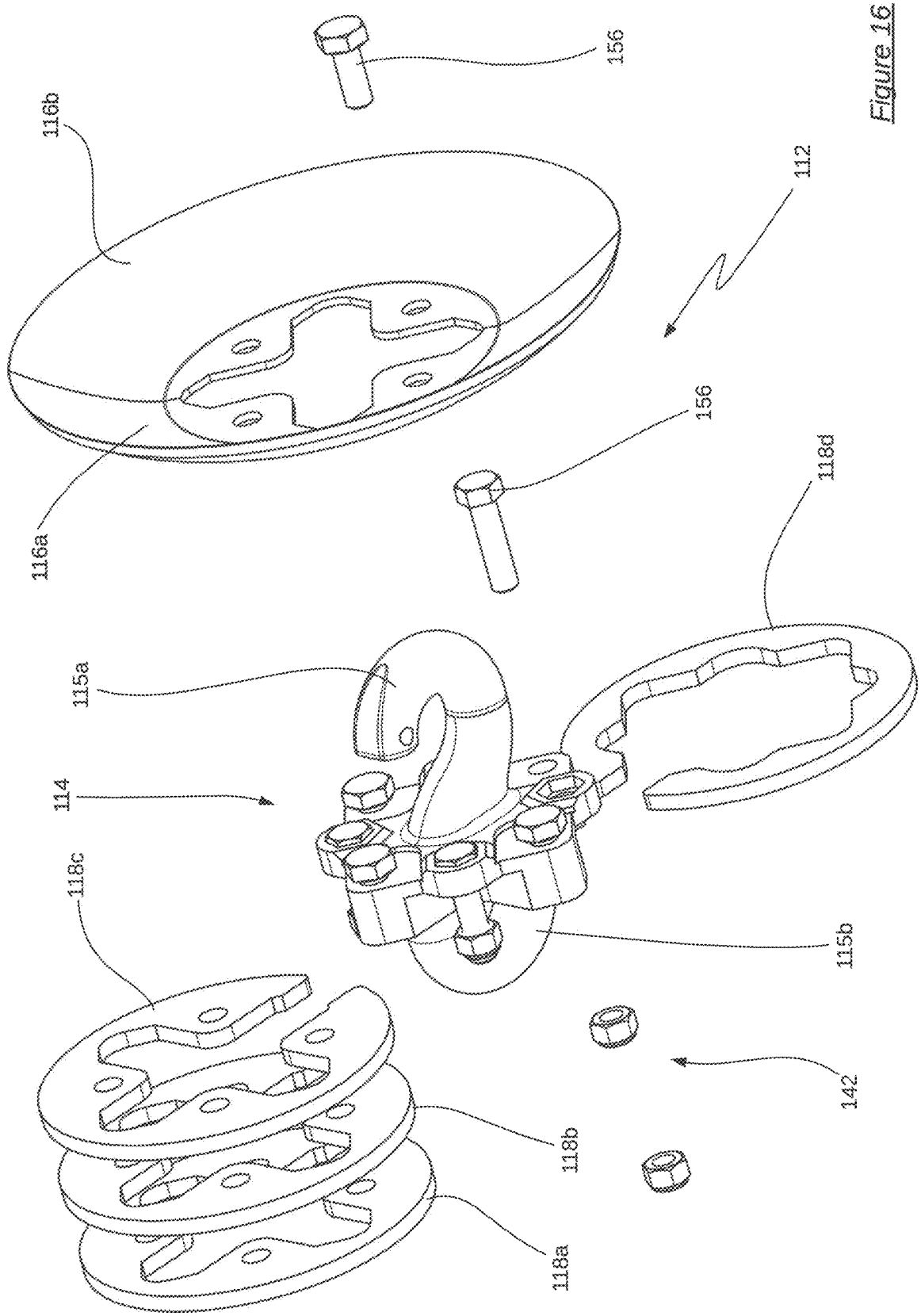
FIG. 16: is an exploded view of a disc chain assembly according to a second embodiment of the present invention.

FIG. 16 shows, in an exploded view, a disc sub-assembly 112 according to another embodiment of the present invention. Component parts and features of the disc sub-assembly 112 that are similar to those of the disc sub-assembly 12 have the same reference numerals with the prefix "1".

The ground engaging tool, which is also a disc 116 for a disc chain harrow, is formed so that it can be connected to a respective one of the hubs 114 of a disc chain harrow assembly (not shown, but formed of a plurality of sub-assemblies 112) whilst that hub 114 is retained interconnected in situ on the harrow assembly, and without the necessity to remove any other disc 112.

The ability to replace discs 116 from the harrow 10 without requiring partial or full disassembly of the harrow is a significant benefit. In the event that disc 116 are worn excessively, or are damaged, the worn discs 116 can be removed and replaced relatively quickly.

The discs 116 are shown in FIGS. 16 and FIG. 21. In this particular embodiment, each of the discs 116 if formed of two disc segments 116a 116b. Each segment 116a, 116b includes a radially inner mounting portion 144 that, when assembled onto the hub 114 is in abutment with the hub 114.

Each segment 116a, 116b also has a radially outer ground engaging portion 160 that is supported on the respective radially inner mounting portion 144. In this particular embodiment, the disc 116 that is assembled by the two segments 116a, 116b is concave, and has a circular chisel edge blade.

The radially inner mounting portion 144 has a generally annular sector shape so as to provide two circumferential end portions 162 that each extend at least partly radially with respect to the hub 114. Further, the radially inner mounting portion 144 forms mounting formations for use in securing the mounting portion 144 to the hub 114. In this embodiment, each disc segment 116a, 116b includes two inwardly projecting lobes 150 that surround the radially inner mounting portion 144. Further, the disc mounting portion 148 on the hub 114 includes four recessed portions 152 that are each shaped to receive one of the lobes 150.

Each disc segment 116a, 116b includes two through holes 155 through which to pass bolts 156 to secure the respective segment to the hub 114.

Figure 20:
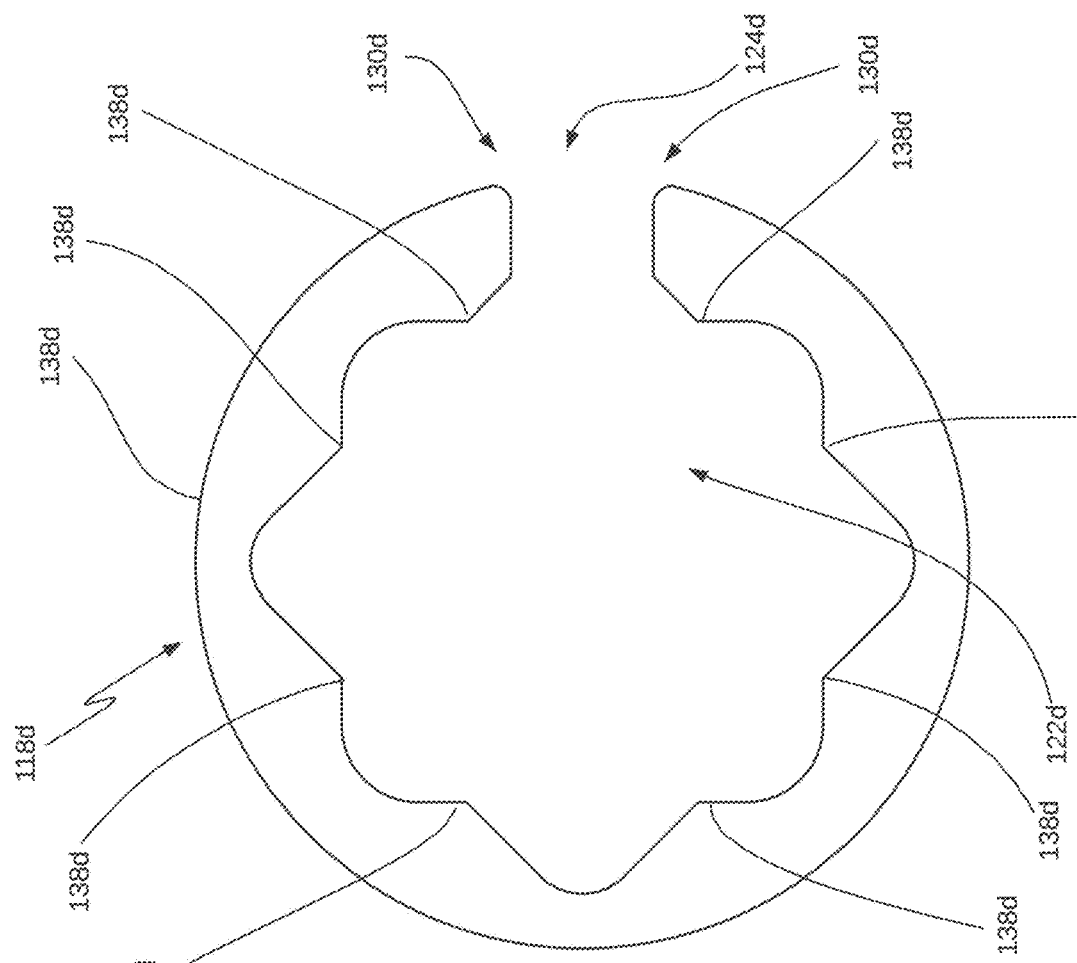
FIG. 20: is a front view of the weight shown in FIG. 19.
Figure 19:
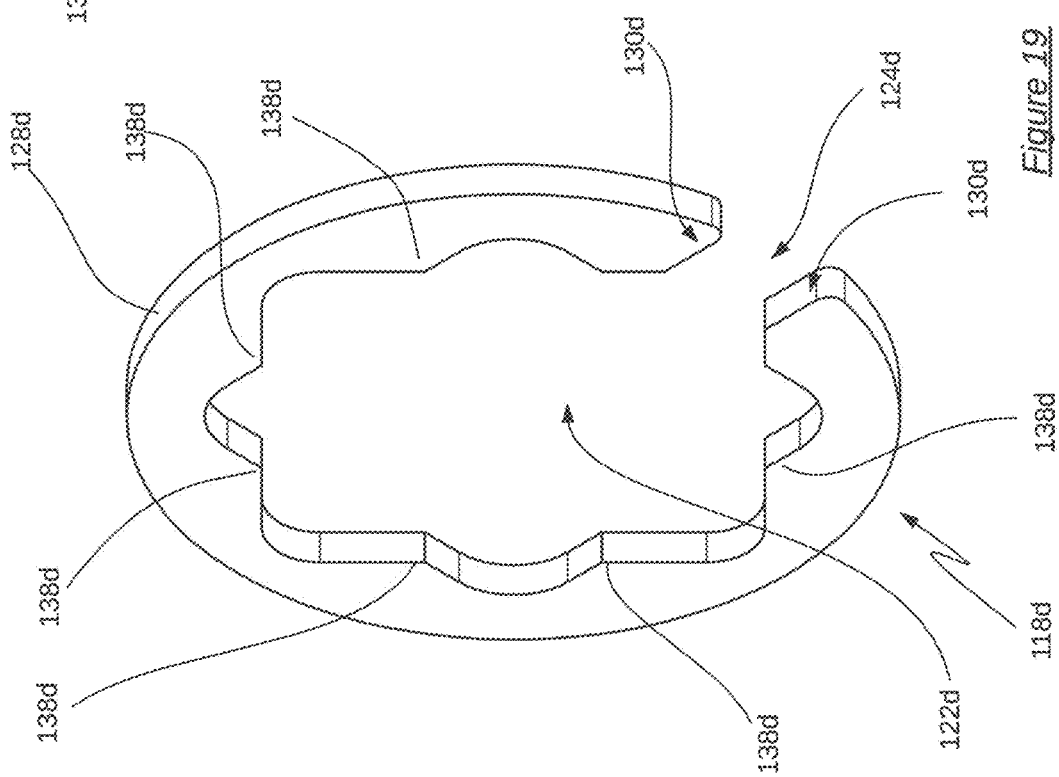
FIG. 19: is a perspective view of a second weight of the disc chain assembly of FIG. 16.

The disc sub-assembly 112 has four weights 118a, 118b, 118c, 118d. Weights 118a to 118c are identical, but weight 118d is of slightly different construction. Weight 118a is shown in FIGS. 17 and 18, and weight 118b is shown in FIGS. 19 and 20.

Weight 118a is substantially similar to the weights 18 shown in FIGS. 12 and 13. The weight 118a differs in that the major faces 126 are both planar. Weights 118a to 118c are secured to the hub 114 in the same manner that weights 18 are secured to the hub 14.

Weight 118d differs from the weights 118a to 118c in that it has eight inwardly projecting lobes 136, and none of the lobes have through holes. As is evident from FIG. 16, weight 118*d* is assembled between the disc segments 116*a*, 116*b*, and at least one of the other weights 118*a* to 118*c*. The weight 118*d* is held in place by clamping force of the bolts 140 holding the set of weight 118 onto the hub 114.

FIGS. 22 to 24 show a disc segment 216 according to another embodiment of the present invention. The disc segment 216 is substantially similar to the disc segments 116*a*, 116*b*. Features of the disc segment 216 that are similar to those of the disc segments 116*a*, 116*b* have the same reference numerals with the prefix "1" replaced with "2".

Disc segment 216 additionally includes a first circumferentially projecting connector, which in this embodiment is in the form of a tongue 264. The tongue projects circumferentially from an annular end face of the disc segment 216. Further, the disc segment 216 includes a second connector that is shaped to co-operate with the tongue 264. In this particular embodiment, the second connector is a keeper 266 that is shaped to receive the tongue 264.

When the disc segment 216 is secured to the hub of a disc chain harrow assembly together with another like disc segment, the tongue of each disc segment 216 is to be positioned within the keep 266. In this way, the tongue and keeper pairs 264, 266 co-operate to minimize deflection of the blade edges at the interface between the two disc segments 216.

In this example, each of the tongue 264 and keeper 266 are located on a rear side of the disc segment 216, having regard to the side of the assembled disc that is intended to approach un-tilled ground.

Figure 25:
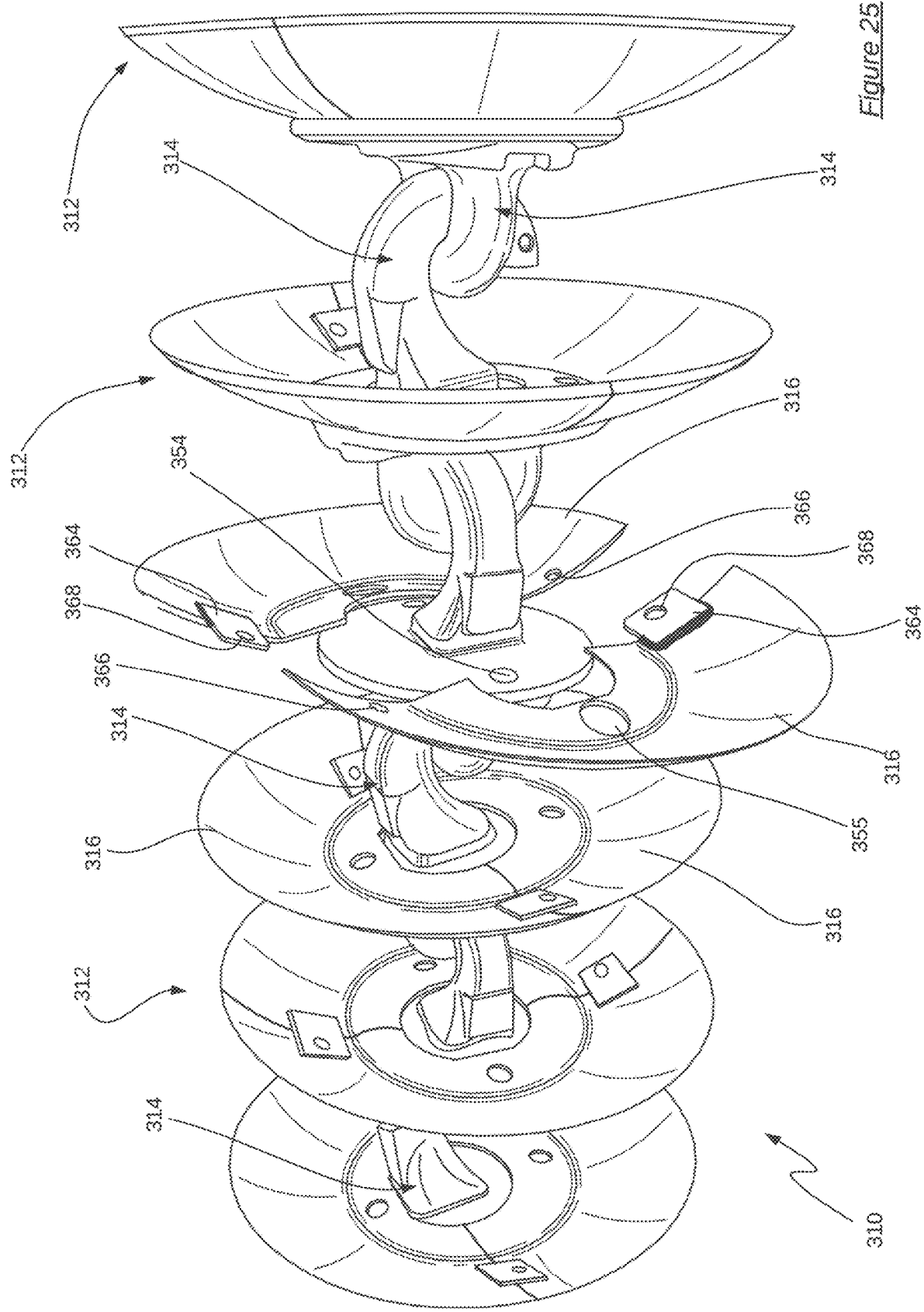
FIG. 25: is a side view of an agricultural disc chain harrow according to a fourth embodiment of the present invention.

FIG. 25 shows an agricultural disc chain harrow 310 according to another embodiment of the present invention. Component parts and features of the harrow 310 that are similar to those of the harrow 10 have the same reference numerals with the prefix "3".

The discs of each disc sub-assembly 312 are segmented, such that each disc is assembled from two disc segments 316, in a similar manner to the disc segments 116, 216. In this particular embodiment, each disc segment 316 includes a first circumferentially projecting connector, which in this embodiment is in the form of a tongue 364 includes a through hole 368. The tongue 364 projects circumferentially from an annular end face of the disc segment 316.

In this example, each second connector is in the form of a through hole 366. When two disc segments 316 are secured to a respective one of the hubs 314, the through hole 368 of the tongue 364, and the through hole second connector 366 are aligned so as to permit a fastener (not shown in FIG. 25) to be passed through the aligned through holes 366, 368.

Figure 26:
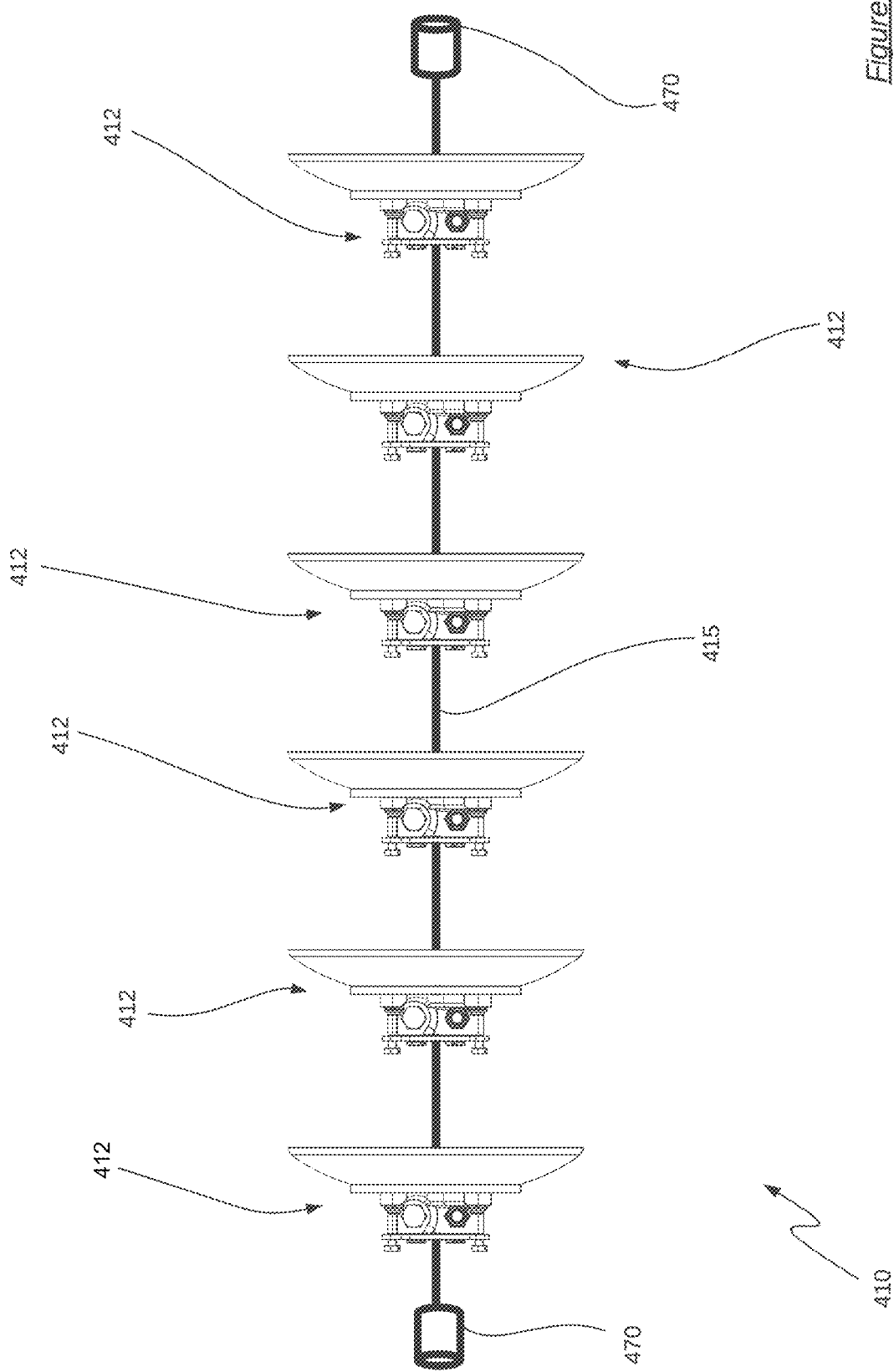
FIG. 26: is a side elevation of an agricultural disc chain harrow according to a sixth embodiment of the present invention.

FIG. 26 shows an agricultural tilling assembly in accordance with an embodiment of the invention. In this particular embodiment, the tilling assembly is an agricultural disc chain harrow 410. The disc chain harrow 410 has an elongate structure, which in this embodiment is the form of a steel multi-strand cable 415, and a number of ground engaging tool sub-assemblies 412. Each sub-assembly 412 is secured to the cable 415, as described in further detail below.

Figure 27:
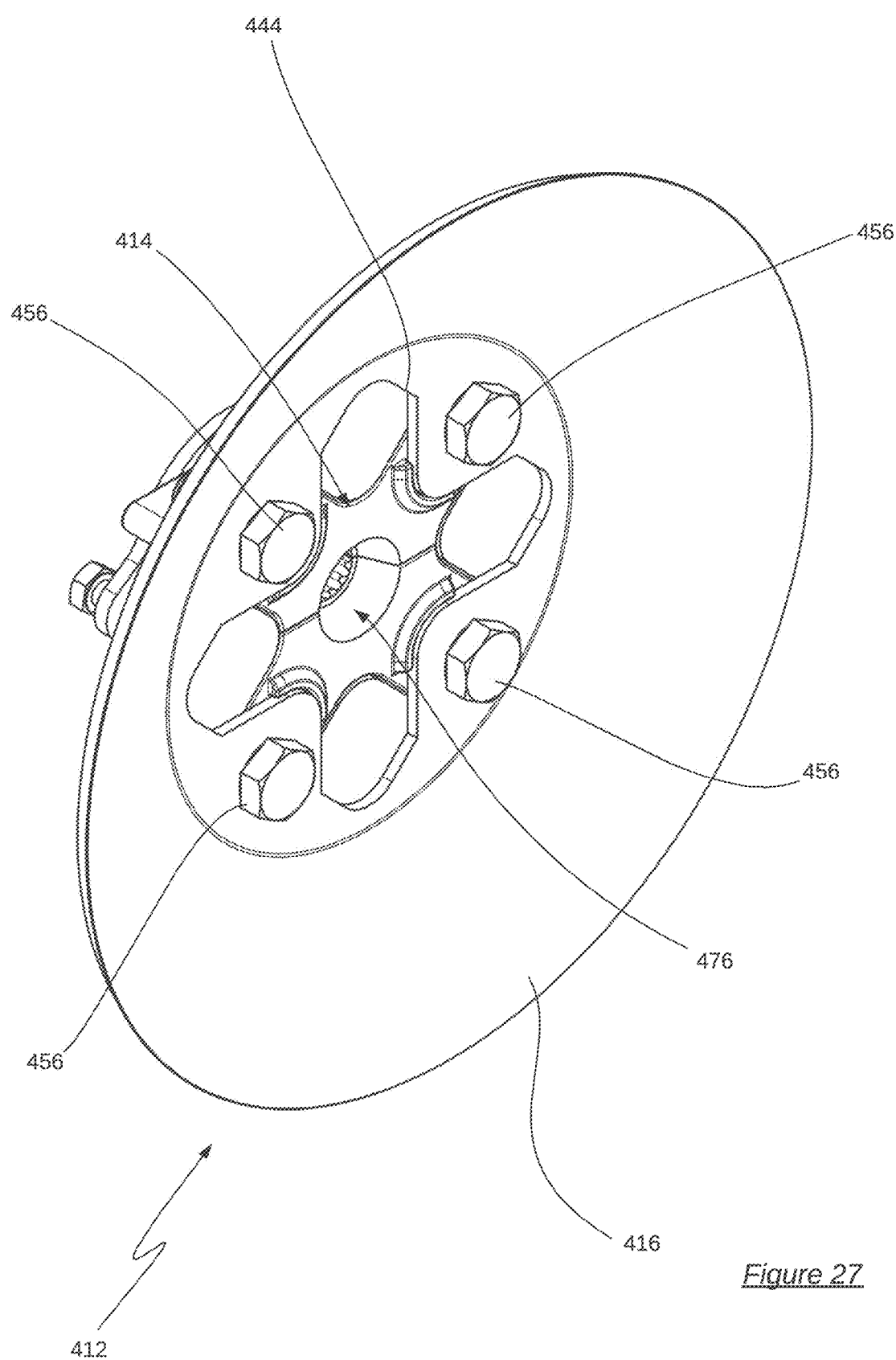
FIG. 27: is a front perspective view of one of the disc chain assemblies shown in FIG. 26.
Figure 28:
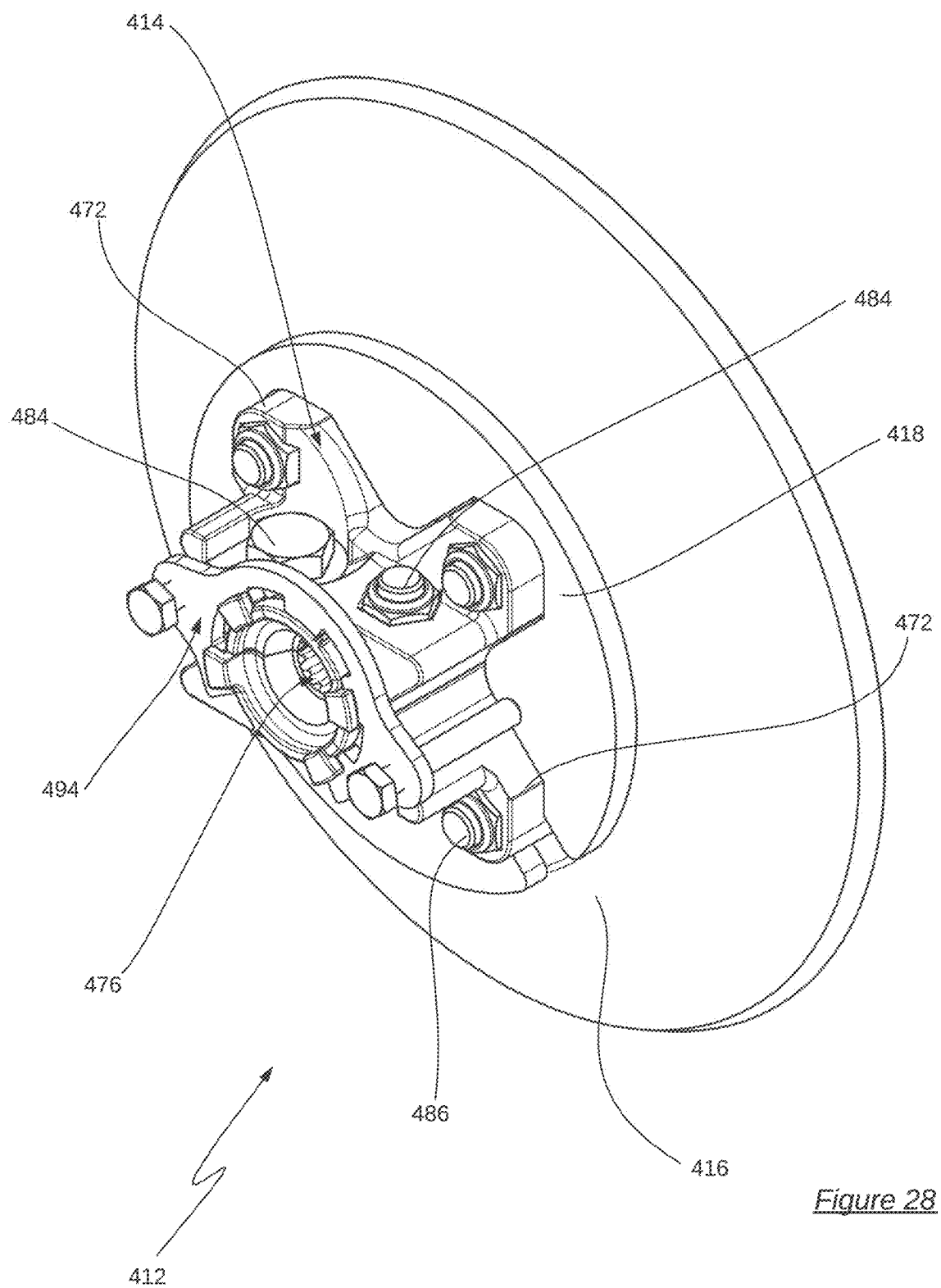
FIG. 28: is a rear perspective view of the disc chain assembly of FIG. 27.
Figure 29:
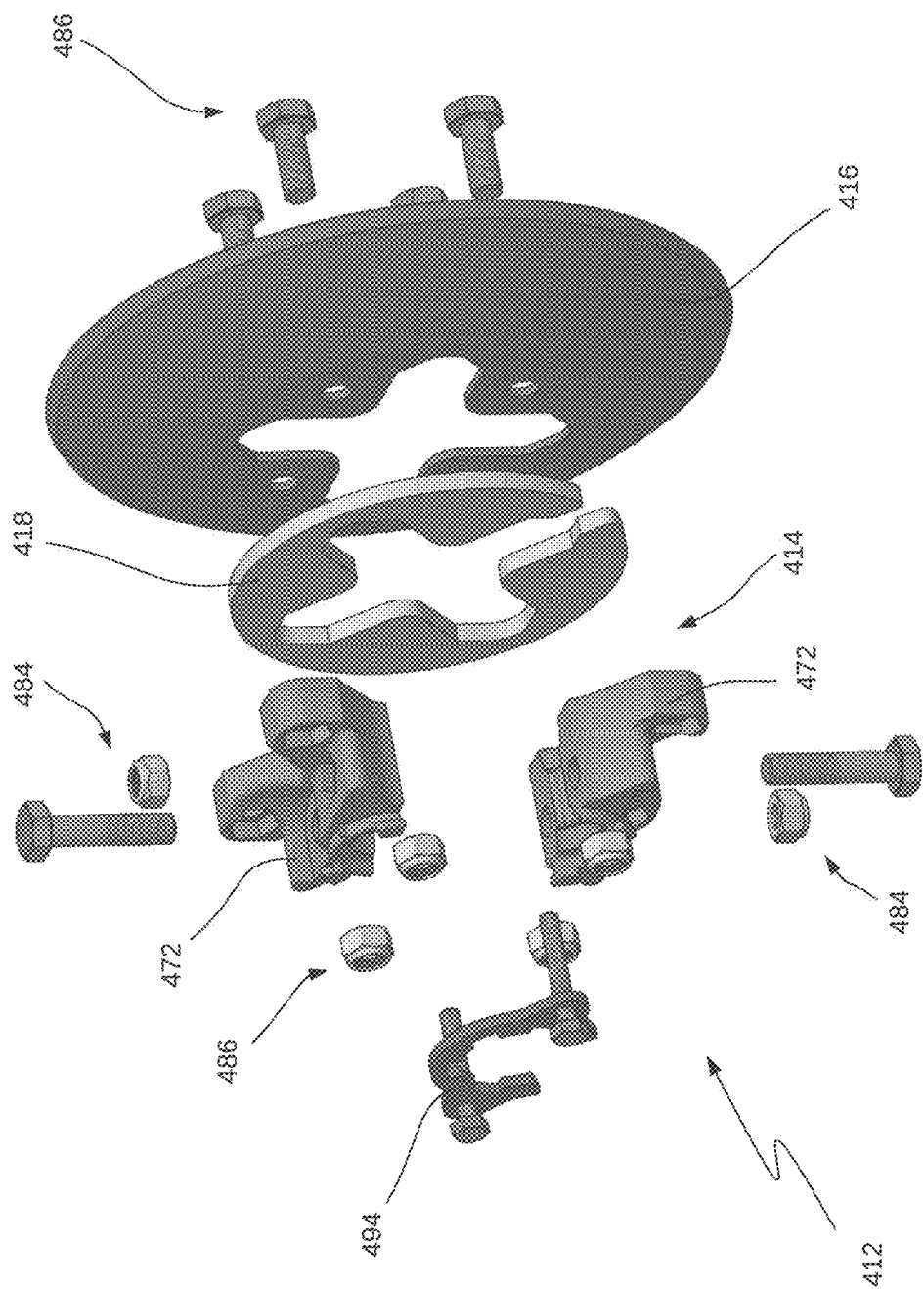
FIG. 29: is an exploded view of the disc chain assembly of FIG. 27.
Figure 30:
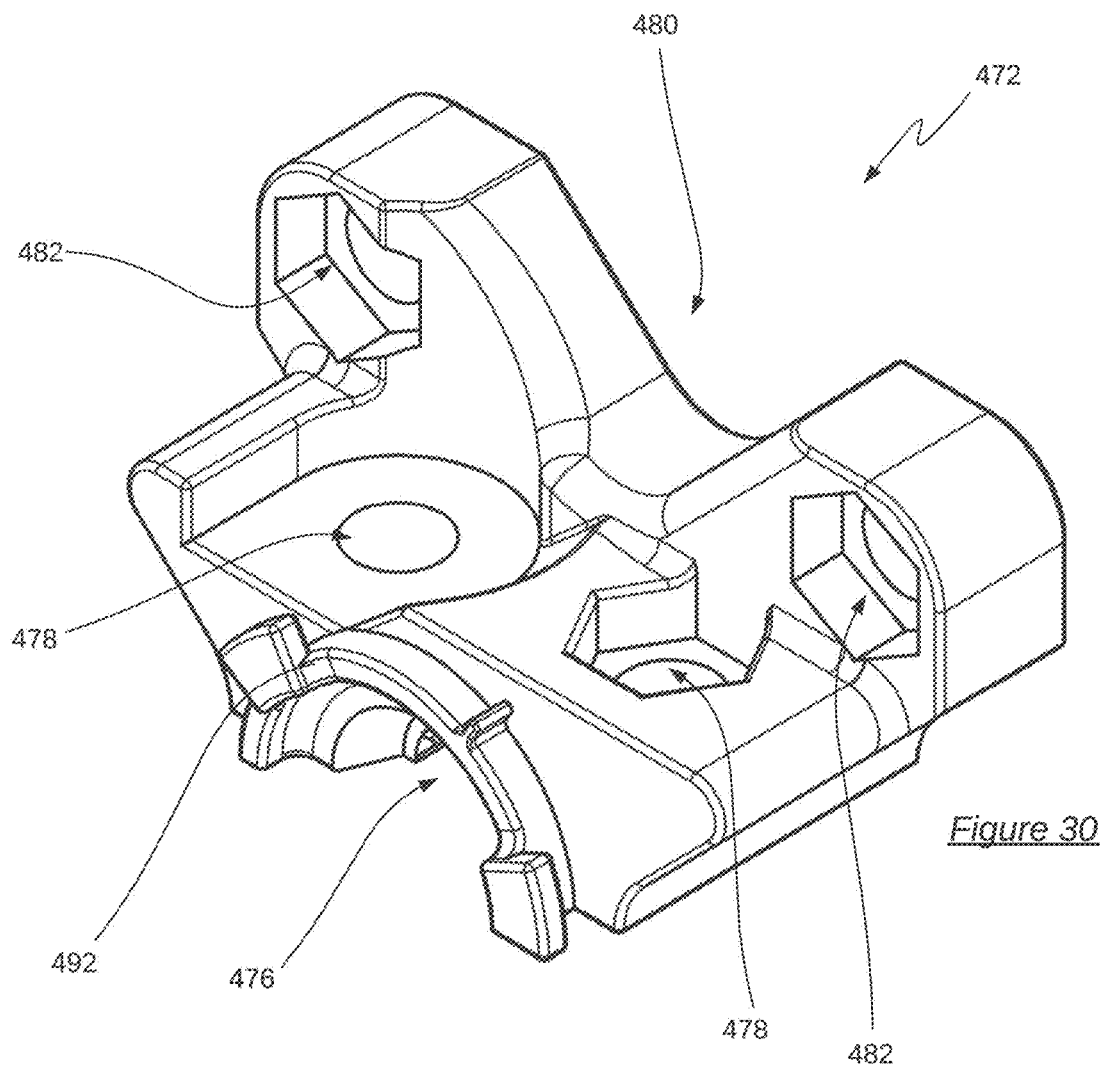
FIG. 30: is a rear perspective view of one of the half hubs of the disc chain assembly of FIG. 27.
Figure 31:
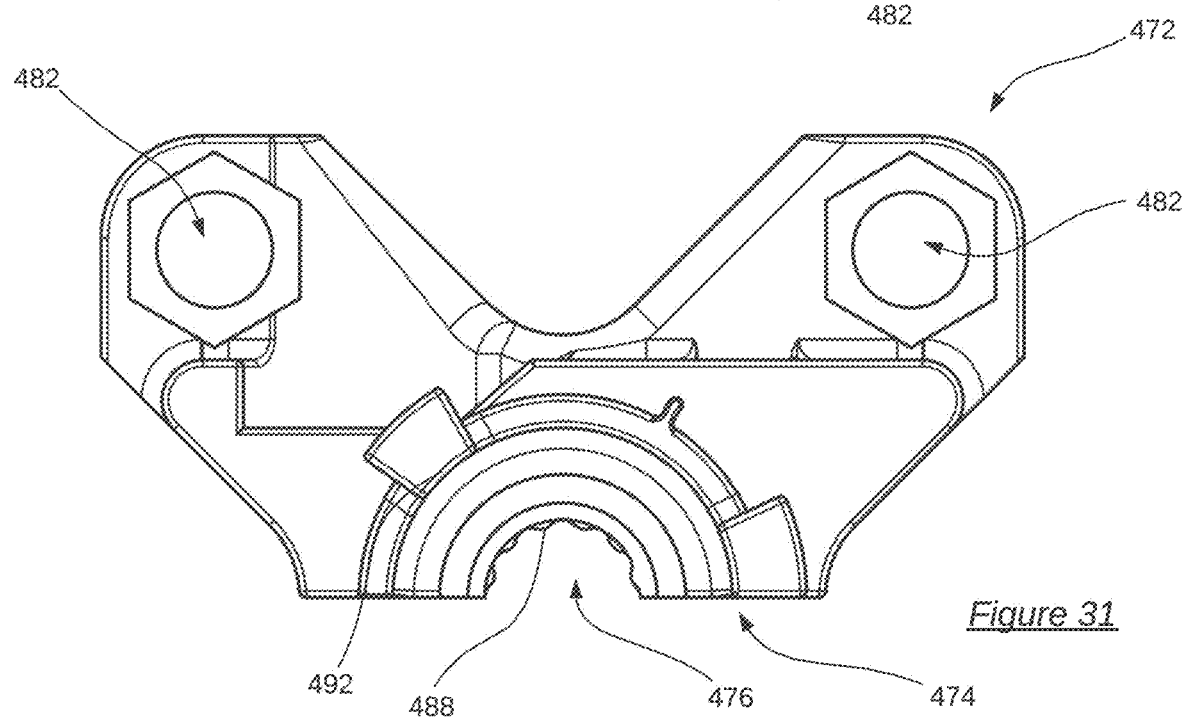
FIG. 31: is a rear view of the half hub of FIG. 30.
Figure 32:
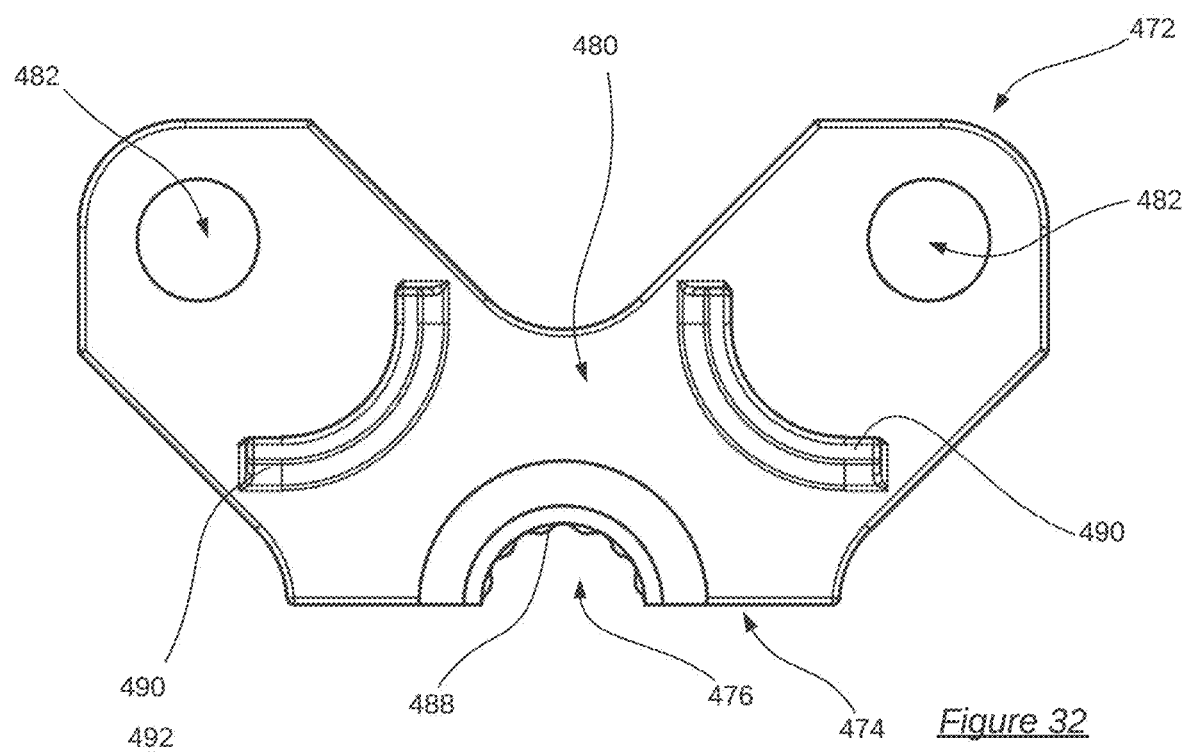
FIG. 32: is a front view of the half hub of FIG. 30.
Figure 33:
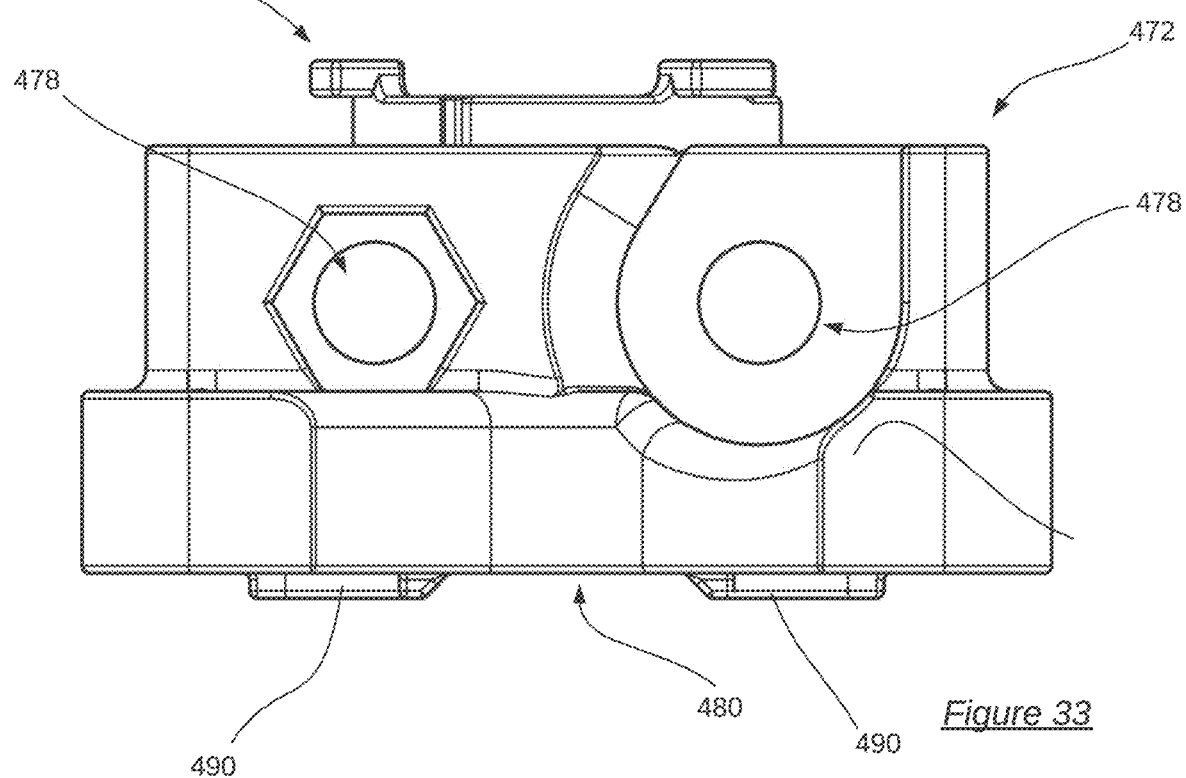
FIG. 33: is a top view of the half hub of FIG. 30.

FIGS. 27 to 29 show one of the sub-assemblies 412, and its component parts, in detail. For simplicity, the description of these figures will generally refer to a single sub-assembly 412.

The sub-assembly 412 includes a hub 414, a ground engaging tool 416, and weights 418. The ground engaging tool 416 in these figures is a disc, however it will be understood that the invention is not limited to discs. In this example, the disc 416 is arranged to be releasably secured to the hub 14.

In use, disc chain harrow 410 is mounted to a harrow frame (not shown), which is towed behind a vehicle (such as a tractor, also not shown). The disc chain harrow 410 may be one of several assemblies that are mounted on the frame. The discs 416 are placed on the ground and then dragged over the ground. In this way, the discs engage the ground and will perform a harrowing function. Opposing ends of the cable 415 are provided with end connectors 470 to facilitate connection of the cable 415 to components of the harrow frame.

In this embodiment, the hub 414 is formed so as to be mountable on the cable 415, without the necessity to remove any in situ hubs 414 that are already mounted on the cable. To this end, the hub 414 comprising at least two separable parts 472*a* 472*b* (hereinafter referred to individually as "separable part 472"), one of which is shown in detail in FIGS. 30 to 33.

Each separable part 472 includes an abutment face 474 with a recessed portion 476 into which to receive the cable 415, and first retaining formations. Each separable part 472 also includes a mounting face 480, and a second retaining formations. In use of the hub 414, the two separable parts 472 are positioned with the abutment faces 474 facing one another, and the mounting faces 480 adjacent one another, as is evident from FIGS. 27 and 28. In this configuration, the recessed portions 476 are aligned to form a through way in which the cable 415 is located.

The first retaining formations 478 in each separable part include a pair of transverse holes 478*a*, 478*b*, and the hub 414 further has two nut and bolt fasteners 484. The bolt shanks of these fasteners 484 pass through the transverse holes 478*a*, 478*b* in the two separable parts 472 and mate with their corresponding nut. On the external side of the separable part 472—in other words, opposite the abutment face 474—one of the transverse holes 478*a* includes a nut-shaped recess to receive a nut, while the other of the transverse holes 478*b* has a clearance around the hole to allow a tool to engage the head of the bolt.

The second retaining formations are used in securing the disc 416 against the mounting faces 480. In this embodiment, the second retaining formations in each separable part 472 include a pair of axial holes 482 and the hub 414 further has four nuts and bolt fasteners 486. The bolt shanks of these fasteners 486 pass through holes 455 in the disc 416 and the axial holes 482 in the two separable parts 472, and mate with their corresponding nut. Tensioning the fasteners 486 thus secures the disc 416 to the hub 414.

On the rear side of the separable part 472—in other words, opposite the mounting face 480—each of the axial holes 482 includes a nut-shaped recess to receive a nut of one of the fasteners 486. As shown in FIG. 27, the heads of the bolts are accessible from the front, working face of the disc 416.

The recessed portions 476 are configured such that tensioning the fasteners 476 applies a clamping force to the cable 415. In addition, as shown particularly in FIGS. 31 and 32, the abutment face of each separable part 472 include engagement formations within the recessed portion 476. In this embodiment, the engagement formations are in the forms of ribs 488. When the hub 414 is mounted on the cable 415, the ribs 488 engage the outer surface of the cable 415 and resist relative movement between the hub 414 and cable 415.

The mounting face 480 of each separable part 472 has a pair of location formations 490 that facilitate location of the disc 416 on the mounting faces 480 relative to the axial holes 482. Each of the location formations 490 has a shape that compliments the lobes 450 on the disc 416.

Each of the separable parts 472 includes a third retaining formation 492, and the hub 414 further has a locking member 494. The third retaining formations 492 and locking member 494 are shaped to interengage with one another. A weight 418 is locatable around the hub 414, and the locking member 494 brought into interengagement with the third retaining formations 492 and operated to retain the weight 418 in position on the hub 414. The weight 418 has a peripheral edge surface that defines an inner cavity 422. The hub 414 has an outer surface shape that complements that of the inner cavity 422.

As shown in FIGS. 28 and 29, the locking member 494 includes a clip portion that interengages with the third retaining formations 492, and a pair of threaded fasteners that extend through internally threaded apertures in the clip portion. In use, the threaded fasteners are operable to bear against the weight 418 to thereby retain the weight 418 in position on the hub 414. As will be appreciated from FIG. 28, the weight 418 is captured between the disc 416 and the fasteners of the locking member 494.

The harrow 410 enables the spacing between adjacent hubs 414 to be varied quickly. The spacing can be varied by removing or adding a number of hubs from the cable 415, or by adjusting the positioning of each hub along the length of the cable 415 and adding or removing hubs as required. In this way, the farmer has an ability to adjust the harrow to better suit the needs of the particular soil or soil condition of the ground to be harrowed.

Figure 34:
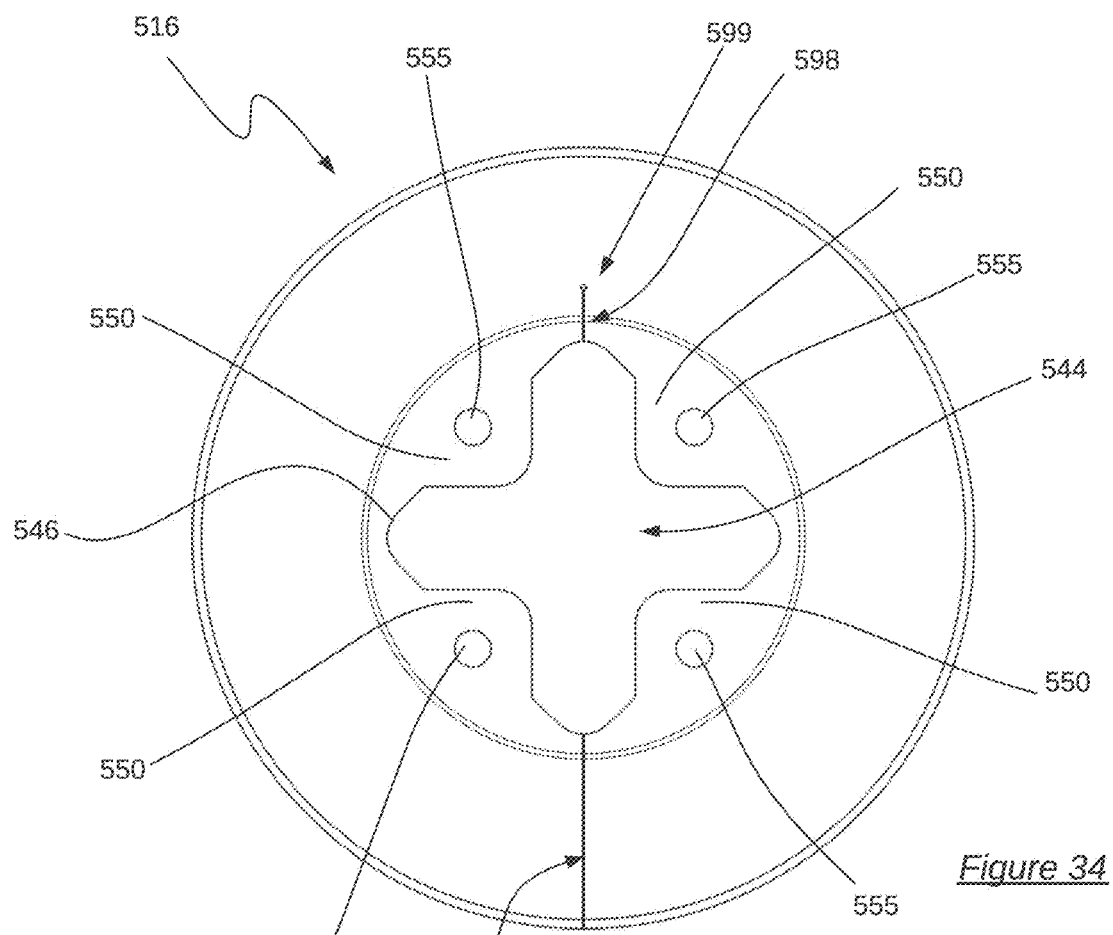
FIG. 34: is a front view of a disc according to a fifth embodiment of the present invention, the disc being for use in an agricultural disc chain harrow.
Figure 35:
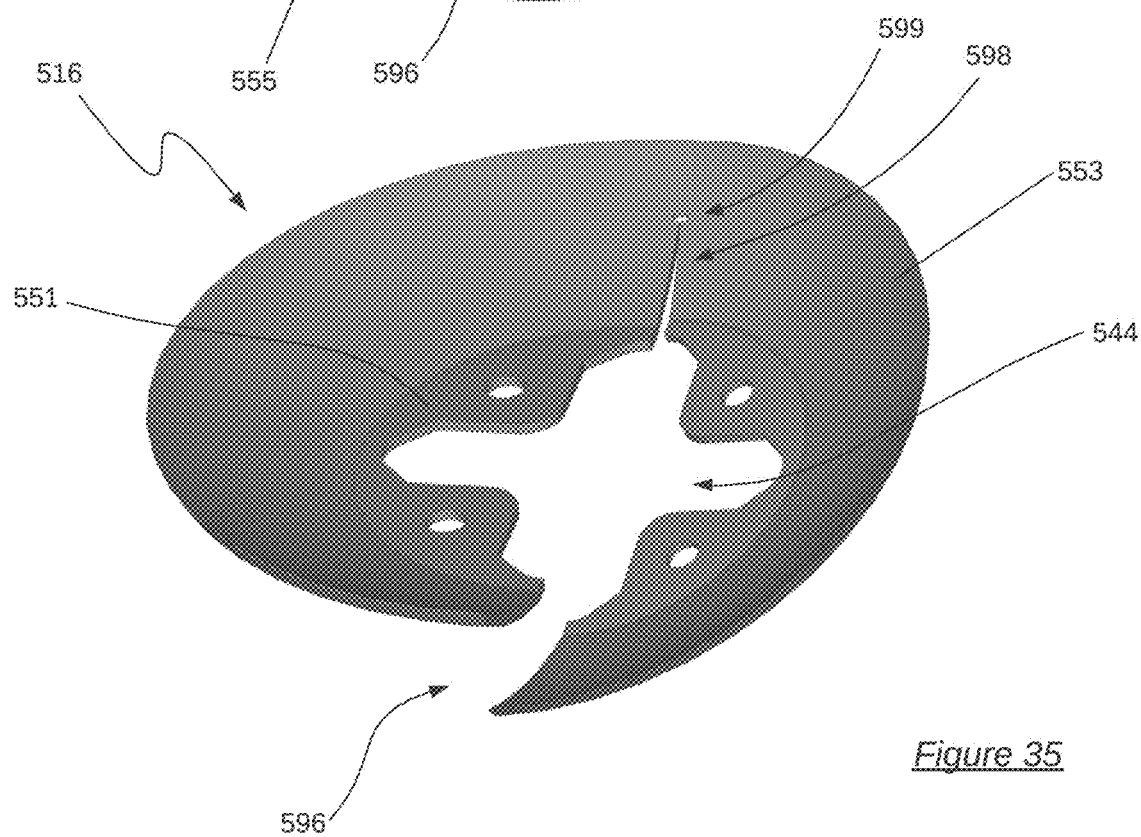
FIG. 35: is a perspective view of the disc of FIG. 34 is a distorted configuration for assembly onto an agricultural disc chain harrow.

FIGS. 34 and 35 show a ground engaging tool 516 for mounting on a hub (not shown) of an elongate agricultural tilling assembly according to another embodiment. The ground engaging tool 516 in these figures is a disc, however it will be understood that the invention is not limited to discs.

The disc 516 includes a mounting portion 551 that has a generally annular shape, and that defines a radially inner edge that is to locate about the hub, and mounting holes 555 for use in securing the mounting portion 551 to the hub. The disc also has a radially outer ground engaging portion 553 that is supported by the mounting portion.

The disc 516 is formed with a first slit 596 that extends between the radially inner edge and the radially outer edge portion of the disc 516. In this particular embodiment, the disc 516 is formed with a second slit 598 that extends from the radially inner edge to a terminal end that is spaced inwardly of the radially outer edge portion of the disc 516. In this embodiment, the terminal end of the second slit 598 includes a stress-relieving formation 599.

The disc 516 is resiliently deflectable to adopt a configuration in which the first slit 596 is open. FIG. 35 shows the disc in a deflected configuration. In this configuration, the yield stress of the disc material has not been exceeded, and upon removal of the deflecting force the disc 516 will be restored to its natural configuration.

As will be appreciated, when the disc 516 is in the deflected configuration, a throughway is formed enabling the disc 516 to be threaded over a part of the elongate agricultural tilling assembly. By way of example only, when in the deflected configuration, the disc 516 could be passed over the eye 15a of the harrow 10, or alternatively over the cable 415 of the harrow 410.

In the illustrated embodiments, the ground engaging tool is generally disc shaped such that the radially outer ground engaging portion is a radially outward facing blade edge that engages the ground. It will be appreciated that the ground engaging tool can have different ground engaging portions, without departing from the invention. For example, the ground engaging tool could be a dog-leg harrow, a spiked-wheel, a scalloped or saw-tooth blade.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

While a particular embodiment of the present agricultural tilling system and components has been described herein, it will be appreciated by those skilled in the art that changes and modifications may be made thereto without departing from the invention in its broader aspects and as set forth in the following claims.

The invention claimed is:

1. An agricultural tilling assembly comprising:
   a plurality of ground engaging tool sub-assemblies that each include;
   a hub including a mounting portion, a hook and an eye,
   a ground engaging tool, and
   fasteners,
   wherein the ground engaging tool sub-assemblies are assembled by interlinking the hooks and eyes of adjacent hubs to form an elongate structure, with the ground engaging tools being spaced apart in the elongate direction of the elongate structure; and
   a plurality of weight plates that each have:
     two major faces that are spaced apart by a peripheral edge surface, and
     one or more through holes through which to pass fasteners of a respective ground engaging tool sub-assembly to releasably secure the weight plate to the hub of that ground engaging tool sub-assembly,
   wherein pairs of adjacent interconnected ground engaging tool sub-assemblies, of which one of those adjacent interconnected ground engaging tool sub-assemblies has one or more of the weight plates secured to the hub thereof and between the two respective ground engaging tools by the respective fasteners, are pivotable relative to one another.

2. The agricultural tilling assembly of claim 1, wherein each pair of adjacent interconnected ground engaging tool sub-assemblies are pivotable relative to one another through a range of relative pivot angles subtending approximately 50° to 60° in a first plane of the respective pair.

3. The agricultural tilling assembly of claim 2, wherein each pair of adjacent interconnected ground engaging tool sub-assemblies are pivotable relative to one another through a range of relative pivot angles subtending approximately 80° to 90° in a second plane of the respective pair, wherein the first and second planes of the respective pair are orthogonal to one another.

4. The agricultural tilling assembly of claim 1, wherein each ground engaging tool sub-assembly is configured such that two or more weight plates are releasably securable by the respective fasteners in a series that extends in the elongate direction from one side of the respective ground engaging tool.

5. The agricultural tilling assembly of claim 4, wherein each ground engaging tool sub-assembly is configured such that when two or more weight plates are secured to respective fasteners in the series, major faces of adjacent pairs of weight plates are in abutment.

6. The agricultural tilling assembly of claim 4, wherein each ground engaging tool sub-assembly is configured such that up to and including four weight plates are securable by the respective fasteners in a series that extends in the elongate direction from one side of the respective ground engaging tool.

7. The agricultural tilling assembly of claim 1, wherein each major face of each weight plate is a generally annular sector of at least 180°.

8. The agricultural tilling assembly of claim 7, wherein each weight plate is configured such that the peripheral edge surface has two circumferential end portions between which a gap is defined, and such that an inner cavity is defined by a radially inward portion of that peripheral edge surface, such that the weight can be located around an article by passing the article through the gap and into the inner cavity, wherein the width of the gap is less than the largest diameter of the inner cavity.

9. The agricultural tilling assembly of claim 1, wherein the peripheral edge surface of each weight plate has a radially inward portion, wherein the radially inward portion of the peripheral edge surface has reflection symmetry along a single axis, and is rotationally asymmetrical.

10. The agricultural tilling assembly of claim 9, wherein each weight plate is configured such that:

the radially inward portion of the peripheral edge surface includes one or more inwardly projecting lobes, and
at least one of the through holes is formed in a respective one of the lobes.

11. The agricultural tilling assembly of claim 1, wherein the hub of each ground engaging tool sub-assembly includes through holes through which to pass the respective fasteners for securing the weight plates to the hub.

12. The agricultural tilling assembly of claim 1, wherein the hub of each ground engaging tool sub-assembly includes:

through holes through which to pass the respective fasteners for securing the weight plates to the hub, and
each through hole in the hub has a hexagonal recess to receive the head of one of the fasteners.

13. The agricultural tilling assembly of claim 1, wherein each ground engaging tool sub-assembly is configured such that the respective ground engaging tool is releasably securable to the mounting portion of the respective hub, or is integrally formed therewith.

14. The agricultural tilling assembly of claim 1, wherein the ground engaging tool of each ground engaging tool sub-assembly is a disc having a concave side and a convex side, and wherein the ground engaging tool sub-assemblies are configured such that the weight plates are securable to the convex side of the respective discs.

15. The agricultural tilling assembly of claim 14, wherein the ground engaging tool sub-assemblies are assembled such that the directions of concavity of the discs are oriented in substantially the same direction.

\* \* \* \* \*